United States Patent [19]

Andow et al.

[11] Patent Number: 4,825,326
[45] Date of Patent: Apr. 25, 1989

[54] DIGITAL CALCULATION TYPE DIFFERENTIAL RELAY

[75] Inventors: Fumio Andow, Hachioji; Noriyoshi Suga, Tama, both of Japan

[73] Assignee: Kabushiki Kaisha Toshiba, Kawasaki, Japan

[21] Appl. No.: 60,351

[22] Filed: Jun. 10, 1987

[30] Foreign Application Priority Data

Jun. 11, 1986 [JP] Japan ................... 61-135840

[51] Int. Cl.$^4$ ............................................. H02H 3/08
[52] U.S. Cl. ........................................... 361/63; 361/78
[58] Field of Search ............... 361/63, 67, 83, 87, 361/80, 79; 364/483, 492

[56] References Cited

U.S. PATENT DOCUMENTS

| | | | |
|---|---|---|---|
| 4,148,087 | 4/1979 | Phadke | 361/80 |
| 4,511,981 | 4/1985 | Andow et al. | 361/80 X |
| 4,686,601 | 8/1987 | Alexander et al. | 361/80 |

FOREIGN PATENT DOCUMENTS 2216377 10/1973 Fed. Rep. of Germany .
3132730  3/1983 Fed. Rep. of Germany .
57-50130 10/1982 Japan .

Primary Examiner—Todd E. DeBoer
Attorney, Agent, or Firm—Oblon, Fisher, Spivak, McClelland & Maier

[57] ABSTRACT

In differential function calculation processing, a value of differential function f(d) is calculated using differences between a plurality of predetermined number p of differential current data Dd sampled at different sampling times. The differential current data is data obtained from differential current Id or a sum of data Dj (j=1 to n where n is the number of the respective terminal currents) obtained from respective terminal currents Ipj. In restraint data calculation processing, restraint data Dr is calculated using respective terminal current data Dj sampled at the same sampling time. In restraint function calculation processing, a value of restraint function f(r) is calculated using differences between a plurality of predetermined number p of restraint data Dr sampled at different sampling times. Then, in comparison processing, the value of differential function f(d) is compared with the value of restraint function f(r). If the value of differential function f(d) is smaller than a value, modified by a predetermined relationship, of restraint function f(r), an inhibit output is generated in the comparison processing. Differential relay processing inhibits a trip operation of a circuit breaker by the inhibit output from the comparison processing. The differential relay processing is so controlled as to execute the trip operation when the inhibit output is not present.

19 Claims, 16 Drawing Sheets

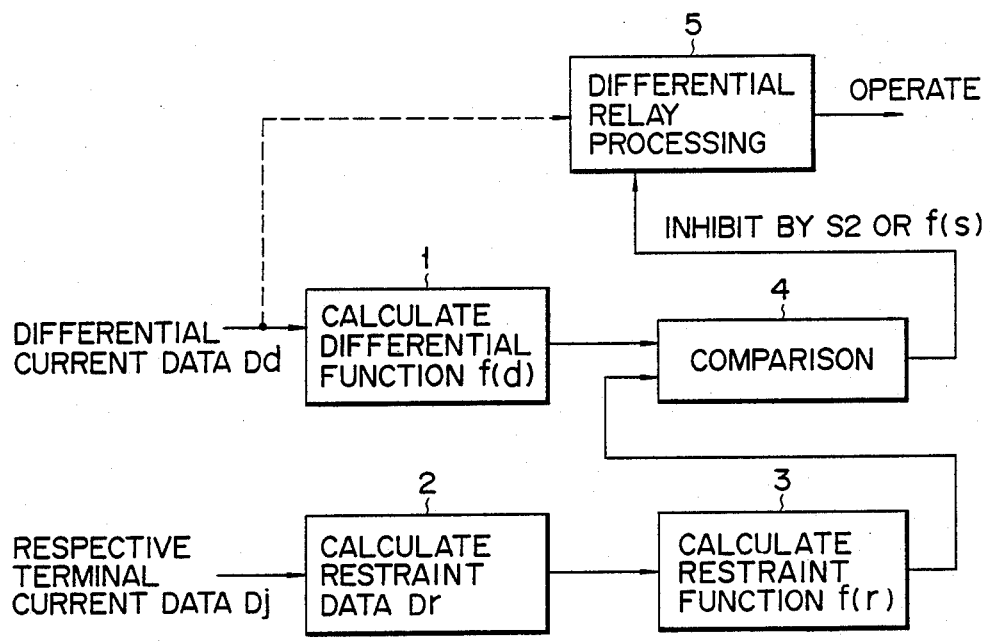
F I G. 1

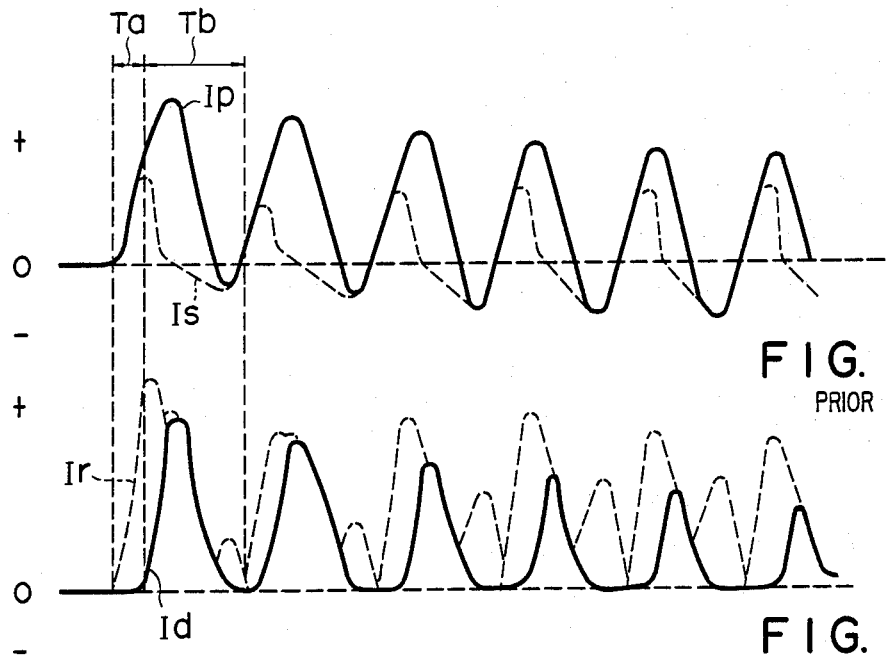
FIG. 2A PRIOR ART
FIG. 2B PRIOR ART
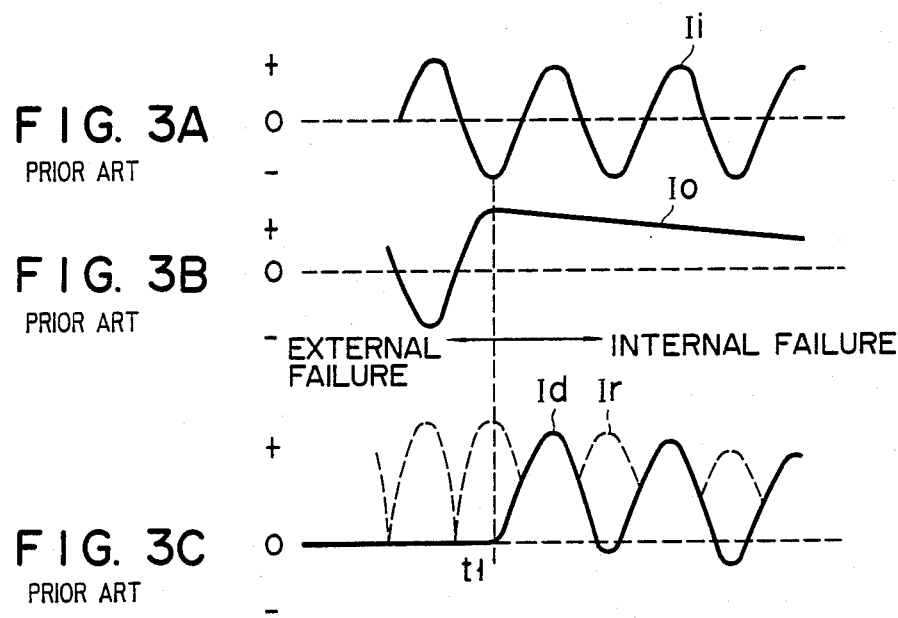
FIG. 3A PRIOR ART
FIG. 3B PRIOR ART
FIG. 3C PRIOR ART

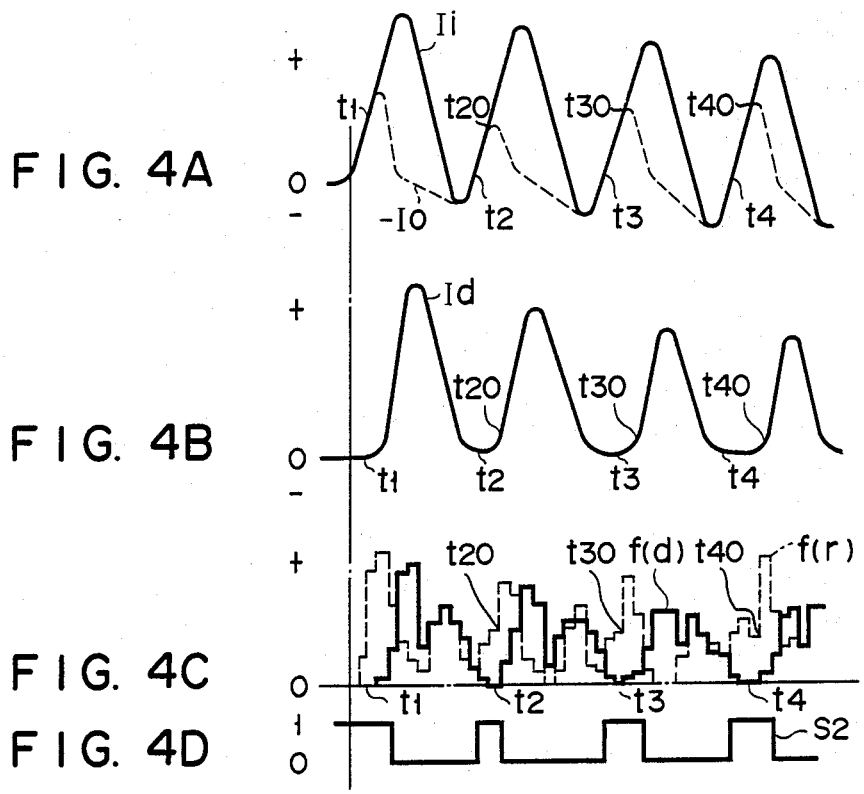
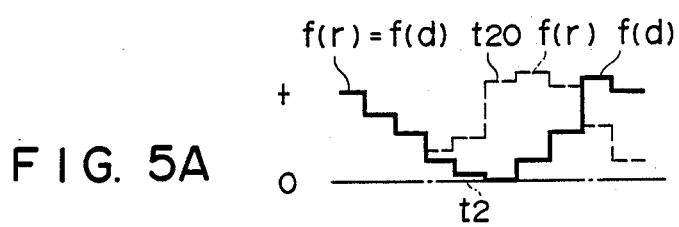
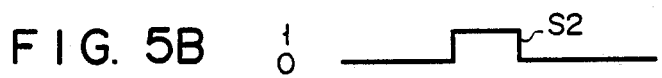
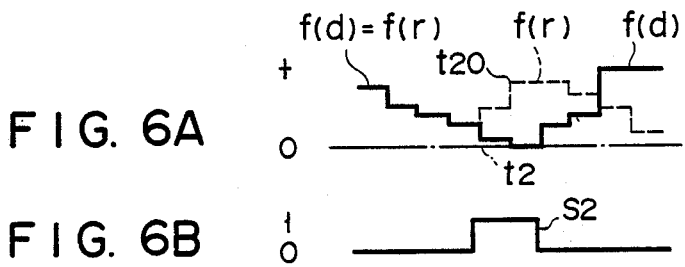

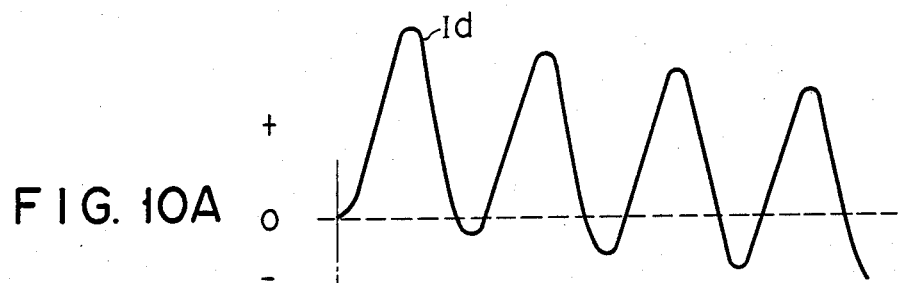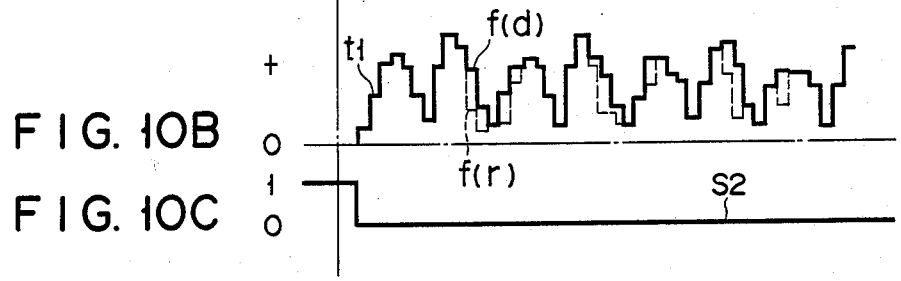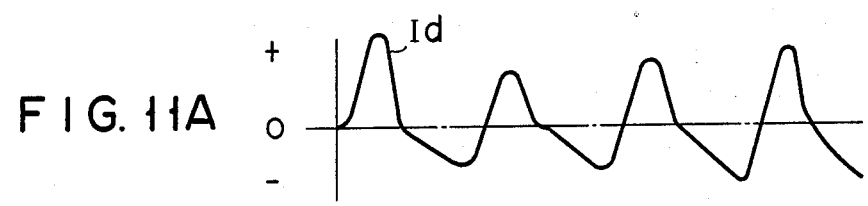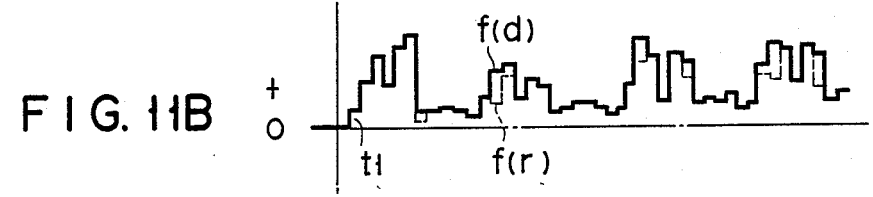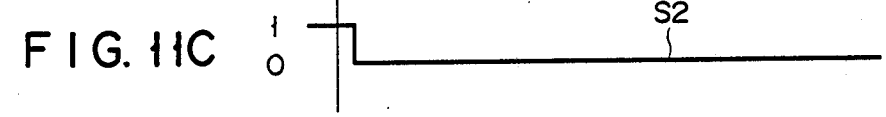

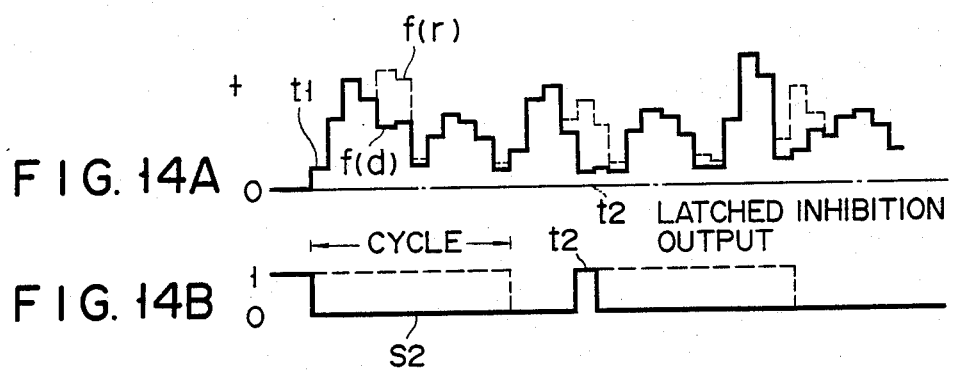
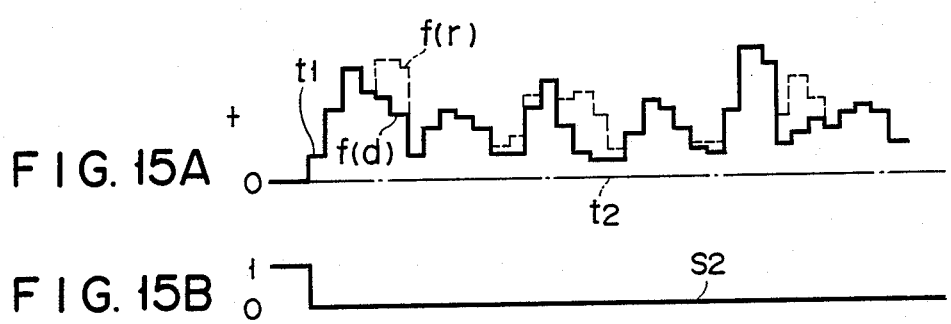
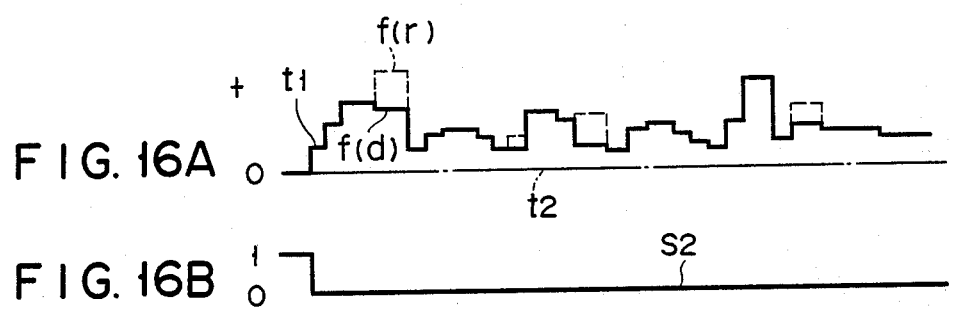

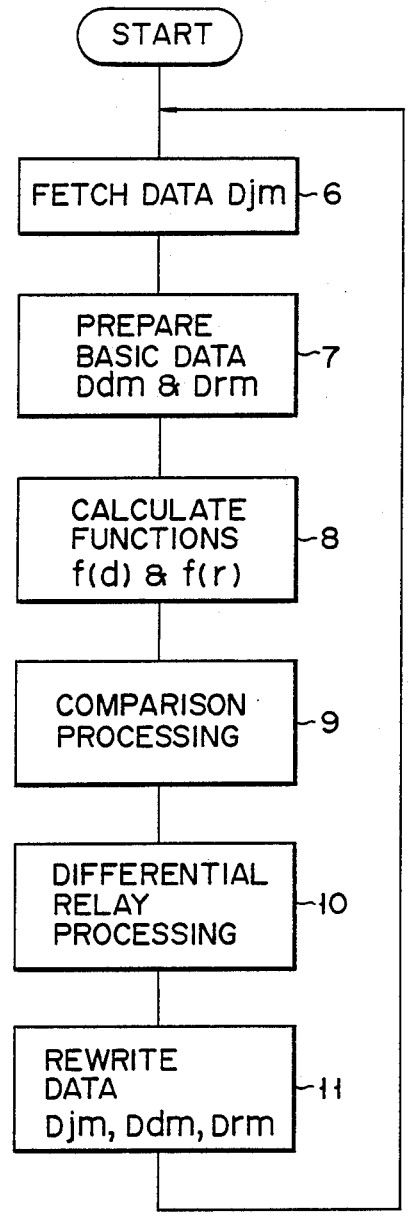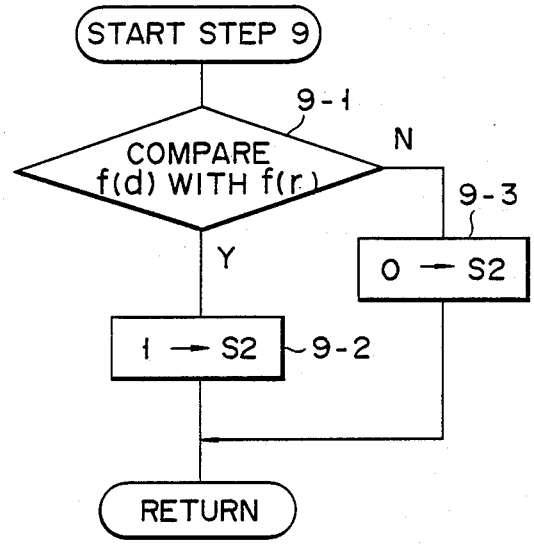
FIG. 19
FIG. 18

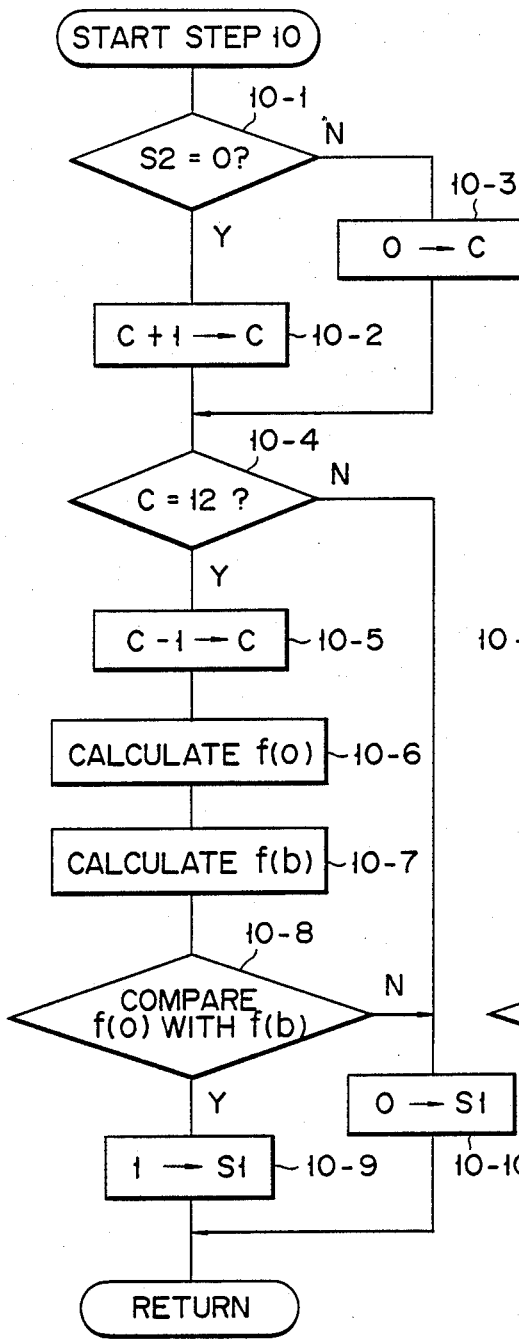 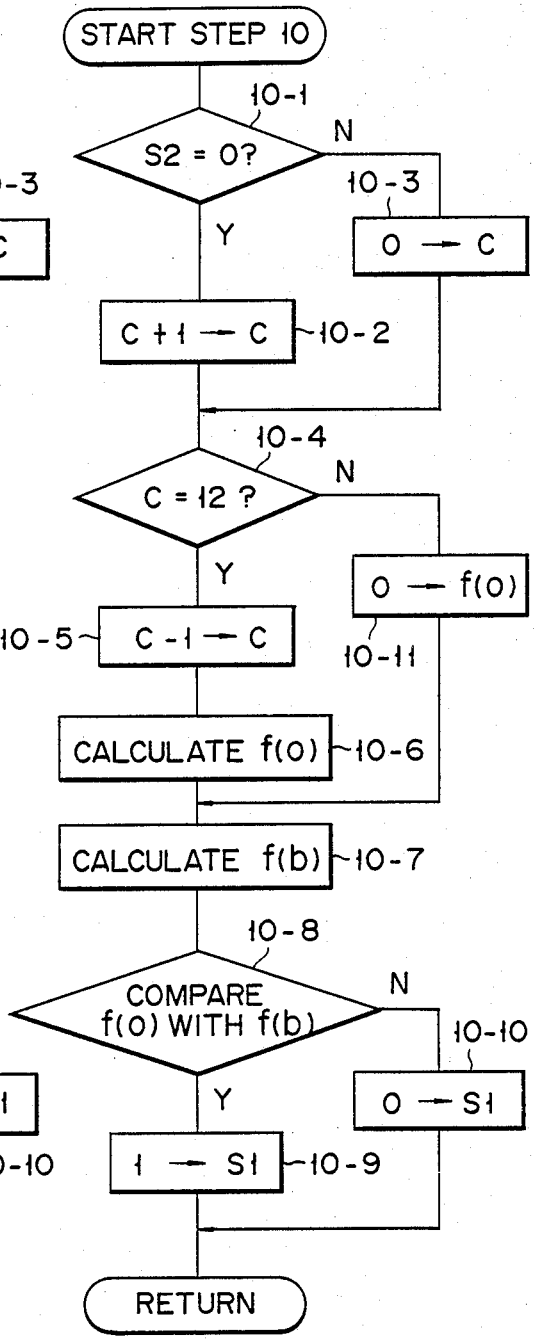
F I G. 20   F I G. 21

DIGITAL CALCULATION TYPE DIFFERENTIAL RELAY

BACKGROUND OF THE INVENTION

The present invention relates to a digital calculation type differential relay used in a bus bar of a power station and/or substation.

A differential relay involves a problem that when an external fault or accident of a bus bar occurs, DC components of currents caused by the fault magnetically saturate an iron core of a current transformer, resulting in an erroneous detection of the current transformer. When bus bar protection is performed, external fault currents, flowing into the bus bar through a number of bus bar terminals, often concentrate to one terminal, so that the concentrated current flows out to one power line from the bus bar. In this case, the magnitude of this one terminal current is increased, such that an iron core of a current transformer connected to this power line tends to be magnetically saturated. At this time, since each value of inflow currents from power lines of other terminals is relatively small, each of the current transformers connected to these power lines is hardly magnetically saturated (or often not magnetically saturated at all). When saturated and nonsaturated current transformers are present at the same time as described above, a differential current (i.e., vector sum of current transformer secondary currents where a current direction from the power line to the bus bar is assumed to be positive) can be increased, regardless of the external fault of the bus bar. Therefore, a relay of the bus bar erroneously responds to the external fault, resulting in a false operation of the relay.

Some differential relays have a countermeasure for magnetic saturation of a current transformer. For example, in a differential relay disclosed in Japanese Patent Publication No. 57-50130, when a value, obtained by subtracting an absolute value of a differential current (vector sum) from a value obtained by multiplying a sum (total scalar values) of an absolute value of each terminal current by a constant of not more than 1, is positive, a significantly large restraining quantity is generated. This will be described below with reference to the drawings.

FIG. 2A is a graph of measured waveforms of primary current Ip and secondary current Is of a current transformer obtained when a current transformer is saturated. As shown in FIG. 2A, intervals Ta and Tb are repeated for every one cycle of an AC component of current Ip. Within interval Ta, magnetic saturation of the current transformer does not occur and almost no error is involved in current Is, and within interval Tb, saturation occurs and a significant error is involved in current Is.

Assume that waveform Is in FIG. 2A represents a secondary current of a current transformer coupled to a terminal to which fault currents caused by the external fault flow, and that all the current transformers of terminals from which the fault current flows are not saturated. Then, a waveform of current Id is as shown in FIG. 2B. At this time, symbol Ir in FIG. 2B represents a sum of absolute values of power line currents of the respective terminals.

As shown in FIGS. 2A and 2B, the value of current Id is almost zero during interval Ta wherein no saturation of an iron core of the current transformer occurs and no error is involved in current Is. An apparatus disclosed in Japanese Patent Publication No. 57-50130 generates a large restraining quantity during interval Ta and stores it. As a result, even if current Id is increased, a false operation of the relay is prevented by this stored restraining quantity.

However, this apparatus has a drawback that when an internal fault occurs during the external fault, an operation of the relay is significantly delayed. FIGS. 3A to 3C show waveforms obtained in the case of this operation delay. In FIGS. 3A to 3C, current Ii is a sum of currents flowing into the bus bar; current Io, a power line current of a terminal from which the fault current flows during the external fault; Id, a differential current equal to a fault point current obtained where the internal fault occurs; Ir, a sum of absolute values of terminal currents; and time tl, a moment at which the internal fault occurs. An interval before time tl represents an occurrence of the external fault.

When the internal fault occurs at a phase of time tl in FIGS. 3A to 3C, the fault point current becomes a full offset waveform having a large DC component, as differential current Id of FIG. 3C. If the external fault has occurred at a position close to the internal fault occurrence position, most of changes in current, after the internal fault occurred, circulate between the internal and external fault occurrence points (this is the Thevenin's theorem). For this reason, inflow current sum Ii does not vary (FIG. 3A). An AC component of outflow terminal current Io before the internal fault occurs is cancelled by a change in current (AC component) after the internal fault occurred, so that only a DC component remains in Io, resulting in a waveform shown in FIG. 3B.

Since Io has such a waveform, sum Ir of absolute values of terminal currents has a waveform shown in FIG. 3C. A large restraining quantity is stored within an interval wherein differential current Id is small while the sum of absolute value Ir is large. In this case, the relay cannot be operated until the DC component of Io sufficiently decreases.

As described above, Japanese Patent Publication No. 57-50130 is arranged such that a fault operation is prevented even when the current transformer is significantly saturated. However, when the internal fault occurs during the external fault, the operation is significantly delayed in accordance with the fault current waveform. In the case of bus bar protection, an internal fault during the external fault often occurs, and this does not rarely happen. For instance, such an internal fault occurs when a circuit breaker fails to trip for the external fault and hence the circuit breaker is damaged.

In consideration of the above situation, Japanese Patent Application No. 61-120909 (to be referred to as a background technology hereinafter) was applied to the Japanese Patent Office by the present applicant, on May 26, 1986. In this background technology, differential current Id is sampled in a predetermined time interval and is converted into digital data. A value of differential function f(d) is calculated on the basis of a difference between a plurality of the predetermined number of data having different sampling times of differential current data Dd (or data equivalent thereto) obtained in the manner as described above. Thus, an operation of a differential relay means of the bus bar is inhibited under the condition that the above calculated value is much smaller than predetermined restraint value f(r). An embodiment described in the background technology sufficiently eliminates the problem of the apparatus disclosed in Japanese Patent Publication No. 57-50130. (All disclosures of the background technology (Japanese Patent Application No. 61-120909) are incorporated in the present application.)

In the embodiment of the background technology, restraint value f(r) corresponds to a maximum value of absolute values of the differential current data sampled in a predetermined interval, or to a maximum value of the sums of absolute values of the respective terminal current data sampled at the same time in the predetermined interval, and the predetermined interval corresponds to one cycle of the power line current (Ip) or more. A ratio f(d)/f(r) of a value of differential function f(d) to restraint value f(r) is sufficiently small during a nonsaturation interval wherein magnetic saturation of the current transformer does not occur by the external fault. On the other hand, in samples around a peak value of differential current Id obtained when the internal fault occurs, f(d)/f(r) is not so large, as is exemplified by f(d)/f(r)=7.7%. For this reason, sufficient care must be paid for design and fabrication of a circuit for forming f(d) so as not to inhibit the operation of the differential relay means on basis of determination that the value of differential function f(d) during occurrence of the internal fault is much smaller than restraint value f(r).

SUMMARY OF THE INVENTION

The present invention has been made in consideration of the above situation, and has as its object to improve restraint value f(r) (to be referred to as restraint function f(r) in the present invention) of the background technology so that differential function f(d) during occurrence of the internal fault becomes not so smaller than restraint value f(r), to thereby assure a more stable operation.

According to the present invention, a normal digital calculation type relay apparatus (as disclosed in Japanese Patent Disclosure No. 59-204421) is used for its a hardware. In this apparatus, an electrical amount, proportional to currents (Ip) obtained from terminals in a protection zone where differential protection is performed, is sampled at a predetermined sampling interval ($\theta$d) and is converted into digital data, and an operation output is generated in accordance with a result of digital data processing. Then, processing to be described below is performed to solve the above problem.

The processing will be described with reference to the drawings. FIG. 1 is a block diagram showing a basic arrangement of the processing according to the present invention. That is, in differential function calculation processing 1, a value of differential function f(d) is calculated using differences between a plurality of predetermined number p of differential current data Dd sampled at different timings. Note that the differential current data is data obtained from differential current Id, or sum of data Dj obtained from protection zone terminal currents Ipj (j=1 to n, and n is the number of respective terminal currents). In restraint data calculation processing 2, restraint data Dr is calculated using respective current data Dj sampled at the same timings, and in restraint function calculation processing 3, restraint function f(r) is calculated using differences between a plurality of predetermined number p of restraint data Dr sampled at the different timings. Then, in comparison processing 4, the value of differential function f(d) is compared with the value of restraint function f(r). When differential function f(d) is smaller than a value, modified by a predetermined relationship, of restraint function f(r), an inhibit output (inhibit signal S2 or inhibit function f(s)) is generated by comparison processing 4. Differential relay processing 5 inhibits its operation by inhibit output S2 or inhibit function f(s). Differential relay processing 5 is so controlled as to enable the operation of the relay when inhibit output S2 (or f(s)) is not present.

Each processing described above will be described below.

Differential function calculation processing 1 is designed to calculate the value of function f(d), using a difference between predetermined number p of differential current data Dd sampled at different timings in predetermined sampling intervals $\theta$s (cf, equation (1) etc). (In general, interval $\theta$s equals to sampling interval $\theta$d of terminal current Ip, but interval $\theta$s may be $\theta$s $\neq \theta$d). Function f(d) represents a condition of a change in p data Dd by a single function. Various functions may be used as f(d), only if the value of function f(d) is decreased when the change in data Dd is small, i.e., when a difference between sampled data Dd is small.

An example of function f(d) is as follows:

f(d)=Absolute Value of Difference between Maximum And Minimum Values Of $$\{Ddm, Dd(m-1), \ldots Dd(m-p+1)\} \qquad (1)$$

$$f(d)=|Sdm|+|Sd(m-1)|+\ldots+|Sd(m-p+2)| \qquad (2) \text{ for,}$$

$$Sdm=Ddm-Dd(m-1)$$

$$Sd(m-1)=Dd(m-1)-Dd(m-2) \qquad (3)$$

$$Sd(m-p+2)=Dd(m-p+2)-Dd(m-p+1)$$

where Ddm, Dd(m−1), Dd(m−p+2), and Dd(m−p+1) are present value, immediately preceding value, (p−2)th preceding value, and (p−1)th preceding value of data Dd, respectively.

f(d) = Maximum Value of $$|Sdm|, |Sd(m-1)|, |\ldots |Sd(m-p+2)| \qquad (4)$$

In equation (1), function f(d) represents the absolute value of the difference between the maximum value (present in the most positive direction) and the minimum value (present in the most negative direction) of p data Dd. In equation (2), function f(d) represents the sum of the absolute value of difference Sd between values of data Dd sampled at adjacent timings. In equation (4), function f(d) represents the maximum value of the absolute value of difference Sd. Either of equations (1), (2), and (4) may be used to determine f(d). In addition, when a change in the value of data Dd is small, f(d) may be obtained by an equation other than equations (1) to (4) as long as the value of Dd is decreased.

Restraint data calculation processing 2 is designed to calculate restraint data Dr using terminal current data Dj sampled at the same timing for every sampling interval $\theta$d, and examples are as follows:

$$Dr = \sum_{j=1}^{n} |Dj| \qquad (5)$$

$$Dr = \text{Maximum Value of } |Dj| \qquad (6)$$

Each of equations (5) and (6) calculates data Dr, i.e., in equation (5), Dr is the sum of the absolute values of data Dj, and in equation (6), Dr is the maximum value of data Dj (where Dj represents respective terminal current data D1, D2, ... Dn).

Data Dr can be divided into two restraint data Dr1 and Dr2 as follows:

$$Dr1 = \sum_{j=1}^{n} (Dj)p \quad (7)$$

$$Dr2 = \sum_{j=1}^{n} (Dj)n$$

Dr1 = Maximum Value of (Dj)p

Dr2 = Minimum Value of (Dj)n  (8)

where (Dj)p represents the values of data Dj obtained by correcting only negative values of data Dj to be zero while positive values thereof remain the same, and (Dj)n represents the values of data Dj obtained by correcting only positive values of data Dj to be zero while negative values thereof remain the same.

In equation (7), Dr1 is the sum of positive ones of data Dj, and Dr2 is the sum of negative ones of data Dj. In equation (8), Dr1 is zero when all of Dj are negative, or has the maximum value of the respective values of data Dj when Dj involves positive data, and Dr2 is zero when all of Dj are positive, or has the minimum value (the value present in the most negative direction) of the respective values of data Dj when Dj involves negative data.

Data Dr may be further increased as follows:

Dr1 = D1, Dr2 = D2 ... Drn = Dn  (9)
Dr1, Dr2 ... Drl = Value Obtained by Adding Plurality of Terminal
Current Data  (10)
Dr(l+1) = D(l+1), Dr(l+2) = D(l+2) ... Dr(l+k) = D(l+k)

Equation (9) utilizes all of data Dj (=D1, D2, ... Dn) as data Dr1, Dr2, ... Drn. In this case, independent processing 2 is not necessary in the present invention. That is, it can be considered that processing 3 includes processing 2. (Otherwise, it may be considered that in processing 3, D1 to Dn correspond directly to Dr1 to Drn).

In equation (10), data Dr1, Dr2 ... Dr are values respectively obtained by adding plurality of data Dj such that Dr1 = D1 + D2, Dr2 = D3 + D4, and the like, and data Dj is used directly as Dr(l+1), Dr(l+2) ... Dr(l+k).

Either of data Dr in equations (5), (6), (7), (8), (9), and (10) can be used to achieve the object. In addition, when a value of a current flowing through the protection zone is increased by the external fault, an equation other than equations (5) to (10) may be adopted as long as data Dr is increased.

Restraint function calculation processing 3 is designed to calculate the value of restraint function f(r) using a difference between predetermined number p of restraint data Dr sampled at different timings in predetermined sampling interval θs. Function f(r) will be exemplified first in the case wherein only one data Dr is present (i.e., in the case of equation (5) or (6)):

f(r) = Absolute Value of Difference between Maximum and Minimum Values of

Drm, Dr(m−1), ... Dr(m−p+1)  (11)

f(r) = |Srm| + |Sr(m−1)| + ... |Sr(m−p+2)|  (12)

f(r) = Maximum Value of

|Srm|, |Sr(m−1)|, ... |Sr(m−p+2)|  (13)

for,

Srm = Drm − Dr(m−1)

Sr(m−1) = Dr(m−1) − Dr(m−2)  (14)

Sr(m−p+2) = Dr(m−p+2) − Dr(m−p+1)

where Drm, Dr(m−1) ... Dr(m−p+1) are current, immediately preceding, and (p-1)th preceding values of data Dr, respectively.

In equation (11), function f(r) corresponds to the absolute value of the difference between the maximum and minimum values of the predetermined number of data Dr, and in equations (12) and (13), function f(r) correspond to the sum or the maximum value of the absolute values of the difference between data Dr sampled at adjacent timings. Either of data Dr in equations (5) and (6) may be used in equations (11), (12), and (13) to achieve the object.

Function f(r) will be exemplified in the case wherein a plurality of data Dr are present, i.e., in the case of equation (7), (8), (9), or (10):

f(r) = f(r1) + f(r2) + ...  (15)

f(r) = Maximum Value of f(r1), f(r2), ...  (16)

where f(r1), f(r2), ... are respectively first, second, ... auxiliary functions obtained from first, second, data Dr1, Dr2, ..., and examples with respect to first auxiliary function f(r1) are as follows:

f(r1) = Absolute Value of Difference between Maximum and Minimum Values of

Dr1m, Dr1(m−1), ... Dr1(m−p+1)  (17)

f(r1) = |Sr1m| + |Sr1(m−1)| + ... + |Sr(m−p+2)|  (18)
f(r1) = Maximum Value of

|Sr1m|, |Sr2(m−1)|, ... |Sr(m−p+2)|  (19)

for,

Sr1m = Dr1m − Dr1(m−1)

Sr1(m−1) = Dr1(m−1) − Dr1(m−2)  (20)

Sr1(m−p+2) = Dr1(m−p+2) − Dr1(m−p+1)

where Dr1m, Dr1(m−1), ... Dr(m−p+1) are respectively current, immediately preceding, and (p-1)th preceding values of data Dr1. Second auxiliary function f(r2) and thereafter are obtained by the same calculation as that of equation (17), (18), or (19) using second restraint data Dr2 and thereafter.

Comparison processing 4 is designed to compare the value of function f(d) with the value of function f(r), and in general, inhibit signal S2 is generated when either one of the following equations is satisfied:

$$f(d) < K1f(r) + K2 \qquad (21)$$

$$f(d) < \text{Maximum Value of K1f(r) And K2} \qquad (22)$$

where K1 and K2 are positive constants, and the value of K1 is not more than 1, e.g., about 0.1 to 0.5.

In accordance with an inhibit method, a value of inhibit function f(s) of the following equation may be output:

$$f(s) = K1f(r) - f(d) \qquad (23)$$

Note that this inhibit output (S2 or f(s)) is held by a latch circuit and the like during an interval of one or more cycles of the terminal current of the main power line. Equations (21) to (23) are applied to the case wherein all functions f(d) and f(r) are designed to calculate positive values using the absolute value of the difference as in equations (2) and (12). If values of parameters included in functions f(d) and f(r) are differences which may be positive or negative (e.g., Sdm in equation (3) and Srm in equation (14)), values (i.e., absolute values) of function f(d) and f(r) are used in equations (21) to (23).

Differential relay processing 5 generally uses a differential relay means identical to that of a conventional differential relay. A conventional differential relay means operates when operation quantity f(o) obtained from data Dd exceeds restraining quantity f(b) of a predetermined value or of a value proportional to the value obtained from data Dj. This conventional means is disclosed in, e.g., Japanese Patent Disclosure (Kokai) No. 59-204421, so that a detailed description thereof will be omitted.

Various methods may be used to control such that an operation of differential relay processing 5 is inhibited by the inhibit output (S2 or f(s)) of comparison processing 4, and examples thereof are as follows:

(i) Generation of an operation output from differential relay processing 5 is inhibited by inhibit signal S2.

(ii) A value of operation quantity f(o) of equation (28) etc (to be described later) is decreased by inhibit signal S2 to be zero or a small value by which the operation cannot be performed.

(iii) A value of restraint amount f(b) of equation (29) etc (to be described later) is increased by inhibit signal S2 to be a large value by which the opertion cannot be performed.

(iv) When the value of inhibit function f(s) is positive, quantity f(b) is combined with a restraint quantity of function f(s), as in equation (32) to be described later.

In addition, according to differential relay processing 5 of the present invention, instead of using data Dd as in the conventional case, a timer counter and the like are used to detect only the fact that a predetermined interval (e.g., one cycle of the terminal current) has passed since equation (21) or (22) is not satisfied, thereby performing the operation. In this manner, the object can be similarly achieved.

In the above description, predetermined sampling interval $\theta$s of differential function calculation processing 1 preferably equals to interval $\theta$s of restraint function calculation processing 3. However, these intervals $\theta$s may be diferent from each other as long as the operation effect is not degraded. In addition, these intervals $\theta$s need not be equal to predetermined sampling interval $\theta$d of original data (Dd). For example, the original data may be irregularly used such as $\theta$s=2$\theta$d and $\theta$s=3$\theta$d. Furthermore, predetermined number p of differential function calculation processing 1 is preferably the same number as that of number p of restraint function calculation processing 3. However, these numbers p may be different from each other as long as the operation effect is not degraded.

Referring to the accompanying drawings, an operation of the present invention will be described below with reference to the external fault of the bus bar. When the current transformer is not magnetically saturated by the external fault, differential current Id is an extremely small value, and differential current data Dd rarely varies. For this reason, the value of differential function f(d) is kept substantially to be zero using either of above-mentioned equations (1), (2), and (4). During this time, the value of restraint function f(r) is increased (f(r) > > f(d)) using either of above-mentioned equations (11) to (19) due to the fault currents flowing through the respective terminals. Therefore, in comparison processing 4, equation (21) or (22) is satisfied or the value of inhibit function f(s) of equation (23) is increased to be a positively large value so as to reliably inhibit the operation by differential relay processing 5.

Now, the case wherein the current transformer is magnetically saturated by the external fault will be described below. In this case, as will be described later, the value of differential function f(d) is significantly decreased with respect to that of restraint function f(r) at least once a cycle of the terminal current, and the inhibit output (S2 or f(s)) is obtained from comparison processing 4 during this interval. The inhibit output is held for one or more cycles of the terminal current, and the operation by differential relay processing 5 is inhibited during this interval.

The phenomenon in which the value of differential function f(d) is significantly decreased with respect to that of restraint function f(r) at least once a cycle of the terminal current will be described below.

FIGS. 4A to 4D are graphs for explaining response of the apparatus of the present invention in the case wherein the failure current flows into a branch line through its terminal from the bus bar when the external fault occurs and the current transformer of this power line is intensely magnetically saturated by the DC component of the fault current while current transformers of power lines of terminals from which fault currents flow are not magnetically saturated. In FIGS. 4A and 4B, Ii, Io, and Id are respectively waveforms of sum of the secondary current of the current transformer of the inflow terminal, of the current transformer secondary current, and of the differential current. Current Io is represented as −Io, which is obtained by inverting a positive/negative polarity of Io, for the sake of comparison convenience. Although the waveform of current −Io is originally the same as that of current Ii, it varies to be the waveform shown in FIG. 1A because of magnetic saturation of the current transformer. The waveform of current Id varies to be that shown in FIG. 4B by this saturation, but a change in current Id is slight during a nonsaturation interval (times t1, t2, t3, and t4) of the current transformer which appears once a cycle.

Examples of differential function f(d) and restraint function f(r) with respect to the waveforms shown in FIG. 4A are shown in FIG. 4C by solid and broken lines, respectively. These examples are obtained when predetermined sampling interval $\theta s$ corresponds to phase 30° of a sine wave of an electric power system frequency, predetermined sampling number p is 3, (a description will be made using these values hereinafter if otherwise specified), and function f(d), data Dr, and function f(r) are respectively equations (1), (5), and (11).

As shown in FIG. 4C, the value of function f(d) before time t1 is almost zero before occurrence of the fault, and this state continues to the end of non-saturation interval of the current transformer at time t1. In addition, the value of function f(d) is significantly decreased at second half times t20, t30, and t40 of the nonsaturation intervals of times t2, t3, and t4. On the other hand, during these nonsaturation intervals, change rates of currents Ii and −Io are increased as shown in FIG. 4A. Therefore, the value of function f(r) is significantly increased with respect to that of function f(d) at times t20, t30, and t40 of the non-saturation intervals. For this reason, even when the value of constant K1 of each of equations (21) to (23) is about 0.1, the inhibit output (signal S2 or inhibit function f(s)) can be reliably obtained.

As described above, inhibit outputs S2 can be obtained during the interval before occurrence of the fault until the end of time t1 and at every nonsaturation interval of the current transformer of times t2, t3, and t4 appearing at least once a cycle thereafter. FIG. 4D shows a generation condition of inhibit signal S2 obtained when constant K1 is 0.2 and constant K2 is significantly decreased (e.g., K2≠0).

FIGS. 5A and 5B to FIGS. 9A and 9B respectively show values of functions f(d) and f(r) obtained when they are changed from the case shown in FIGS. 4A to 4D, the generation condition of inhibit output signal S2 obtained when constants K1 and K2 remain the same as those in FIGS. 4A to 4D, with respect to the interval around time t2 of FIGS. 4A to 4D at which the nonsaturation interval of the current transformer is short and the inhibit output is rarely generated. In each graph of FIGS. 5A and 5B to FIGS. 9A and 9B, restraint data Dr and restraint function f(r) are respectively as shown in TABLE 1 below. Note that in TABLE 1, only F(r1) is shown as an auxiliary function, other auxiliary functions f(r2) and thereafter are the same equations as that of f(r1).

TABLE 1

| | Differential Function f(d) | Restraint Data Dr | Restraint Function f(r) | Auxilliary Function f(rl) |
|---|---|---|---|---|
| FIGS. 5A and 5B | Equation (2) | Equation (5) | Equation (12) | — |
| FIGS. 6A and 6B | Equation (4) | Equation (5) | Equation (13) | — |
| FIGS. 7A and 7B | Equation (1) | Equation (7) | Equation (15) | Equation (17) |
| FIGS. 8A and 8B | Equation (1) | Equation (7) | Equation (16) | Equation (17) |
| FIGS. 9A and 9B | Equation (1) | Equation (9) | Equation (15) | Equation (17) |

In either case of TABLE 1, the value of function f(d) is significantly decreased at the second half (time t20) of time t2, and at the same time, the value of function f(r) is significantly increased with respect to that of function f(d), so that inhibit output S2 can be reliably obtained. This operation is repeated at other nonsaturation intervals.

Note that in TABLE 1, FIGS. 5A and 5B show the case wherein data Dr is represented by equation (5) as in FIGS. 4A to 4D and functions f(d) and f(r) are respectively changed to equations (2) and (12). In addition, FIGS. 6A and 6B show the case wherein data Dr is represented by equation (5) and functions f(d) and f(r) are respectively changed to equations (4) and (13). Furthermore, FIGS. 7A and 7B to FIGS. 9A and 9B show the case wherein data Dr and function f(r) are changed while function f(d) is represented by equation (1) as in FIGS. 4A to 4B.

In FIGS. 7A and 7B to FIGS. 9A and 9B, when function f(d) is changed to equation (2) or (4), or when function f(rl) and the like are changed to equation (18) or (19), inhibit output S2 can be similarly reliably obtained (although not shown for explanation). That is, when predetermined number p is 3, the values of equations (2) and (13) fall within the range of values equal to and twice those of equations (1) and (17), respectively, and the values of equations (4) and (19) fall within the range of values ½ and equal to those of equations (1) and (17), respectively. Even when the values in the respective drawings are changed within the above ranges and constant K1 of equation (21) or (22) is set to be about 0.1, inhibit output S2 can be reliably obtained.

Although an example of a waveform of restraint function f(r) obtained when restraint data Dr in equation (6), (8), or (10) is not shown in the above description, this will be described below. In the case of a general application, the number of terminals to which the fault current flows from the bus bar due to the external fault is only 1 or 2. For example, when 2 current transformers of the outflow terminals are saturated to the same extent due to the outflow fault current, a sum of secondary current waveforms of the current transformers of the outflow terminals becomes the same as that obtained by changing a symbol of current −Io in FIG. 4A to +. For this reason, in the case wherein 2 outflow terminals are present, maximum values of absolute values of the respective terminal currents are not decreased below ½ of the absolute value of current −Io in FIG. 4A.

Meanwhile, in the nonsaturation interval of the current transformer, e.g., at time t2, the maximum value of the absolute value of respective terminal current data Dj of equation (6) is not decreased below ¼ of the sum of the absolute value of data Dj of equation (5) (in the case where currents flow out via terminals). Therefore, the value of function f(r) of the nonsaturation second half (t20) interval obtained when data Dr is given by equation (6) is not decreased below ¼ of the value obtained when data Dr is given by equation (5). For this reason, the value of function f(r) of the nonsaturation second half (t20) interval in FIGS. 4A to 4D to FIGS. 6A and 6B is increased enough with respect to that of function f(d), and if constant K1 in equation (21) or (22) is about 0.1, inhibit output S2 can be reliably generated even when the value of function f(r) is decreased to ¼. Therefore, when data Dr is given by equation (6), inhibit output (S2) is sufficiently generated.

In addition, the value of function f(r) of the non-saturation second half (t20) interval obtained when restraint data Dr1 and Dr2 are given by equation (8) is not decreased below ¼ of that obtained when data Dr1 and Dr2 are given by equation (7), thereby reliably generating inhibit output (S2).

In equation (10), data Dr are added with data Dj to be used as data Dr1 to Drl for some of the terminals, and for the other terminals, data Dj are used directly as restraint data (Dr(l+1) to Dr(l+k)). However, terminals to be added with data are normally limited to non-power source terminals (terminals having no power source at the opposite side thereof) or weak power source terminals equivalent thereto. The reason for this is as follows. That is, a current of the non-power source terminal is of a significantly small value as long as fault is not present outside the terminal. Therefore, when the fault is not present outside the terminal added with the terminal current data, almost no contribution is present for function f(r) regardless that the data is added or not. In addition, when the fault is present outside the terminal added with the data, the current other than the outflow current of the non-power source terminal is so small and can be neglected, so that a waveform of the added data is substantially the same as that of individual data. Therefore, after the data of the respective terminals are added, the value of function f(r) is substantially the same as that obtained from data of individual terminal.

With such a relationship, as long as the data of the non-power source terminal is added and even when data Dr of equation (10) is used, an arrangement of FIG. 1 operates similarly to the case of FIGS. 9A and 9B in which data Dr of equation (9) is used.

As described above, either of data Dr and function f(r) in equations (5) to (19) can be used to sufficiently generate the inhibit output in the case of the external fault with saturation of the current transformer.

An operation in the case of the internal fault will be described below. FIGS. 10A, 10B, and 10C, and FIGS. 16A and 16B show features of values of functions f(d) and f(r) with respect to the waveforms of various differential currents Id in the case of the internal fault. In each drawing, the waveform of current Id, function f(d), data Dr, function f(r), and function f(rl) are defined in TABLE 2 below.

waveform of the current of each saturated terminal is the same as that of Ii' and its amplitude is smaller than that of Ii'. Current Id is a sum of currents Ii and Ii' and has a waveform shown in FIG. 12C.

Functions f(d) and f(r) shown in FIGS. 10A to 10C to FIGS. 12A to 12E are obtained when function f(d) is equation (1), data Dr is given as equation (5), and function f(r) is equation (11). In this case, the value of function f(r) is not larger than that of function f(d), so that if the value of constant K1 of equation (21) or (22) is set to be about 0.2 to 0.5 or less, inhibit output S2 is not erroneously generated.

The above relationship can be obtained because a change in value of data Dr is decreased when a change in value of data Dd is decreased. Of the waveforms in FIGS. 10A to 10C and FIGS. 11A to 11C, the waveform of current Id is the same as that of each current Ij, and when a change in current Id is small, a change in current Ij is also small. For this reason, when either of equations (1) to (23) described with reference to FIG. 1 is used for data Dr and function f(r), the value of function f(r) is decreased when the value of function f(d) is decreased, so that inhibit output S2 is not generated.

On the contrary, around time t1 of the waveforms in FIGS. 12A to 12E, current Ii' is decreased while current Ii is increased, so that the change in current Id is decreased. For this reason, depending on selection of data Dr and function f(r), the value of function f(r) is undesirably increased when the value of function f(d) is small. Therefore, an operation with respect to the waveforms in FIGS. 12A to 12E will be described below with reference to FIGS. 13A and 13B to FIGS. 16A and 16B.

In the case of FIGS. 13A and 13B, data Dr and function f(r) are changed as shown in the above TABLE 2 with respect to the case of FIGS. 12A to 12E. In this

TABLE 2

| | Waveform of Id | Differential Function f(d) | Restraint Data Dr | Restraint Function f(r) | Auxiliary Function f(rl) |
|---|---|---|---|---|---|
| FIGS. 10A To 10C | FIG. 10A | Equation (1) | Equation (5) | Equation (11) | — |
| FIGS. 11A To 11C | FIG. 11A | Equation (1) | Equation (5) | Equation (11) | — |
| FIGS. 12A To 12E | FIG. 12C | Equation (1) | Equation (5) | Equation (11) | — |
| FIGS. 13A And 13B | FIG. 12C | Equation (1) | Equation (7) | Equation (15) | Equation (17) |
| FIGS. 14A And 14B | FIG. 12C | Equation (1) | Equation (9) | Equation (15) | Equation (17) |
| FIGS. 15A And 15E | FIG. 12C | Equation (2) | Equation (9) | Equation (15) | Equation (18) |
| FIGS. 16A And 16E | FIG. 12C | Equation (4) | Equation (9) | Equation (15) | Equation (20) |

The waveform of current Id shown in FIG. 10A is obtained when all the current transformers of the inflow terminals are nonsaturated, in which an attenuating DC component is superposed on an AC current of a sine wave. Since currents of the respective inflow terminals are in substantaally an identical phase, the obtained waveform is substantially the same as that of current Id and its amplitude is smaller than that of current Id.

The waveform of current Id shown in FIG. 11A is obtained when the fault current flows only from one terminal and the current transformer of the terminal is perfectly saturated (i.e., when the fault current does not flow from other terminals).

Waveforms shown in FIGS. 12A to 12E are obtained when current transformers of some of terminals from which the fault currents flow are saturated and those of other terminals are not. Current Ii in FIGS. 12A to 12E is a sum of the currents of the non-saturated terminals, and a waveform of the current of each non-saturated terminal is the same as that of Ii and its amplitude is smaller than that of Ii. In addition, current Ii' is a sum of the currents of the respective saturated terminals, and a case, the relationship $f(r) \neq f(d)$ is not obtained in the waveforms of FIGS. 12A to 12E, so that the value of function f(r) represented by equation (15) is always equal to that of function f(d) represented by equation (1). Therefore, inhibit output S2 is not generated as in the case of FIGS. 10A to 10C to FIGS. 12A to 12E.

In FIGS. 14A and 14B, data Dr is determined by equation (9) as shown in TABLE 2 with respect to FIGS. 13A and 13B. In this case, the value of function f(r) is equal to or larger than that of function f(d). Especially at time t2 shown in FIG. 14A, the value of function f(d) is 0.173 times that of function f(r). Therefore, if constant K1 is set to be 0.2, inhibit signal S2 is generated at time t2 as shown in FIG. 14B.

Although generation of signal S2 is not preferable in this case, the system can be put into practical use. The reason for this will be described below. Since signal S2 appears once a cycle as described above, an interval wherein signal S2 need be held is one cycle. An inhibit signal holding interval in the case wherein the holding interval is one cycle is represented by a broken line in FIG. 14B. Holding of signal S2 generated before occurrence of the fault is eliminated before generation of signal S2 at time t2, and a protection operation with respect to the bus bar can be performed in this interval. In addition, since signal S2 is not generated after time t2, a bus bar protection function is recovered within one cycle after time t2. Furthermore, if constant K1 is set to be not more than 0.173, signal S2 is not generated at time t2. As described above, in the case of FIGS. 14A and 14B, the system can be sufficiently put into practical use to achieve the object.

In the case of FIGS. 15A and 15B and FIGS. 16A and 16B, data Dr remains the same and function f(d) and functions f(rl) . . . are changed as shown in TABLE 2 with respect to FIGS. 14A and 14B. In this case, although the value of function f(r) is larger than that of function f(d) as described above, the condition is improved as compared with the case of FIGS. 14A and 14B. That is, ratio f(d)/f(r) of the value of function f(d) to that of function f(r) at time t2 is 0.269 in FIGS. 15A and 15B, and is 0.29 in FIGS. 16A and 16B, so that if constant K1 is 0.2, signal S2 is not generated.

Function f(d), data Dr, and function f(r) in a case that is not shown will be described below. Assuming that predetermined number p is set to be 3, even when function f(d) is changed to equation (2), function f(r) is changed to equation (12), and function f(rl) is changed to equation (18) in the case of FIGS. 10A to 10B to FIGS. 13A to 13B, the values of the respective functions fall within the range of values equal to and twice those shown in the drawings. Even when function f(d) is changed to equation (4), function f(r) is changed to equation (13), and function f(rl) is changed to equation (19), the values of the respective functions fall within the range of values equal to and ½ those shown in FIGS. 10A to 10C to FIGS. 13A and 13B. Therefore, as long as constant K1 is set at not more than 0.5, inhibit output S2 is not reliably generated.

In addition, when restraint data Dr is given by equation (6) instead of equation (5) and by equation (7) instead of equation (8), and restraint function f(r) is given by equation (16) instead of equation (15), the value of function f(r) is decreased below those shown in FIGS. 10A to 10C to FIGS. 13A and 13B, so that inhibit output S2 is not generated.

Furthermore, as long as an addition of data Dr is limited to the current data of the non-power source terminal as described above, the current of the non-power source terminal is slight during occurrence of the internal fault. Therefore, if data Dr is obtained from equation (10) instead of equation (9) and is added, almost no difference is generated in an operation.

Finally, the case of FIGS. 3A to 3C, in which the fault mode transits from external fault to internal fault, will be described below. In this case, current Id is a sum of currents Ii and Io, and a change in current Io is small, so that a change in current Id is substantially the same as that in current Ii. Therefore, the operation of FIG. 1 after the fault transits from the external fault to the internal fault is the same as that with respect to the internal fault of the bus bar, so that the inhibit output (S2 or f(s)) is not generated.

As has been described above, according to the present invention, if the current transformer is intensely magnetically saturated, inhibit output S2 is reliably obtained for the external fault of the bus bar, and inhibit output S2 is reliably not generated for the internal fault of the bus bar line, thereby reliably discriminating the external fault from the internal fault so as to assure bus bar protection.

BRIEF DESCRIPTION OF THE DRAWINGS

FIG. 1 is a block diagram of a basic arrangement of the present invention;

FIGS. 2A and 2B are timing charts of curren waveforms obtained when the current transformer is magnetically saturated;

FIGS. 3A to 3C are timing charts of current waveforms obtained when the internal fault occurs after the external fault;

FIGS. 4A to 4D are respectively timing charts of current waveforms and an operation of the arrangement shown in FIG. 1 when the current transformer is magnetically saturated due to the external fault;

FIGS. 5A and 5B, 6A and 6B, 7A and 7B, 8A and 8B and 9A and 9B are timing charts of an operation of the arrangement shown in FIG. 1 when the differential function, the restraint function, and other conditions are changed as shown in TABLE 1;

FIGS. 10A to 10C are timing charts of an operation of the arrangement shown in FIG. 1 when the current transformer is not magnetically saturated due to the internal fault;

FIGS. 11A to 11C are timing charts of an operation of the arrangement shown in FIG. 1 when the fault current caused by the internal fault flows into only one terminal and the current transformer of the terminal is magnetically saturated;

FIGS. 12A to 12E, 13A and 13B, 14A and 14B, 15A and 15B and 16A and 16B are timing charts of an operation of the arrangement shown in FIG. 1 when current transformers of some of the terminals from which the fault currents flow due to the internal fault are magnetically saturated and current transformers of other terminals are not magnetically saturated;

FIG. 18 is a flow chart of a processing flow for the embodiment of FIG. 17;

FIG. 19 is a flow chart showing step 9 of FIG. 18 in detail;

FIG. 20 is a flow chart showing step 10 of FIG. 18 in detail;

FIG. 21 is a flow chart showing another processing sequence of step 10 of FIG. 18 in detail;

DETAILED DESCRIPTION OF THE PREFERRED EMBODIMENTS

Preferred Embodiments of the present invention will now be described below with reference to the accompanying drawings. In this description, common or similar parts in the respective drawings are denoted by common or similar reference symbols for the sake of simplicity of the description.

[First Embodiment]

Figure 7A:
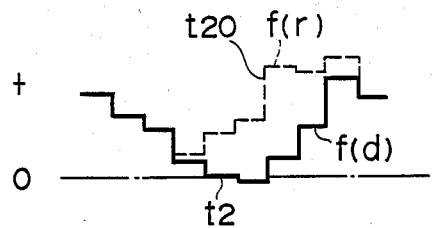
Figure 7B:
Figure 8A:
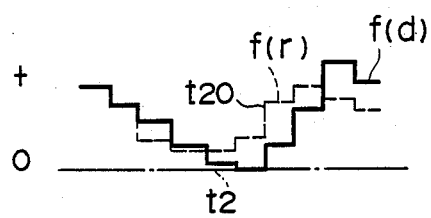
Figure 8B:
Figure 9A:
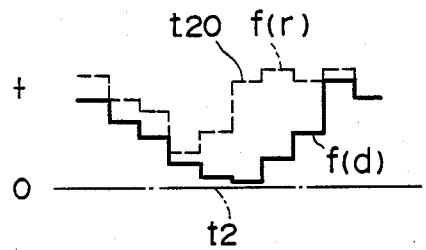
Figure 9B:
Figure 12A:
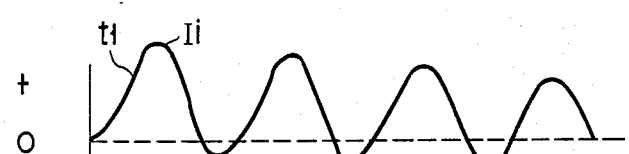
Figure 12B:
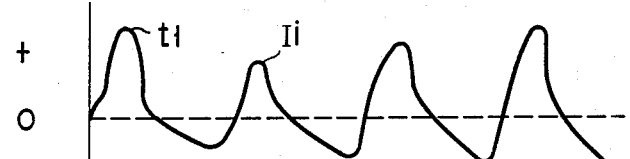
Figure 12C:
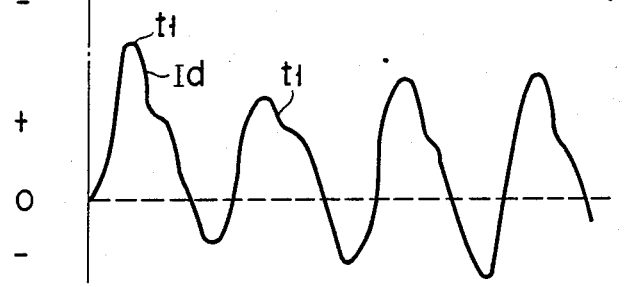
Figure 12D:
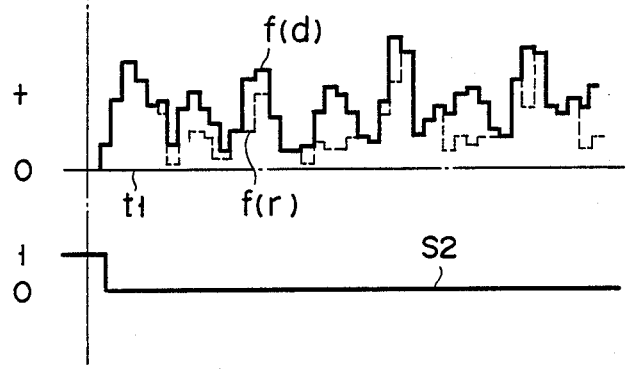
Figure 12E:
Figure 13A:
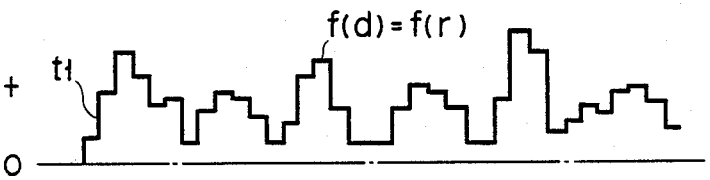
Figure 13B:
Figure 17:
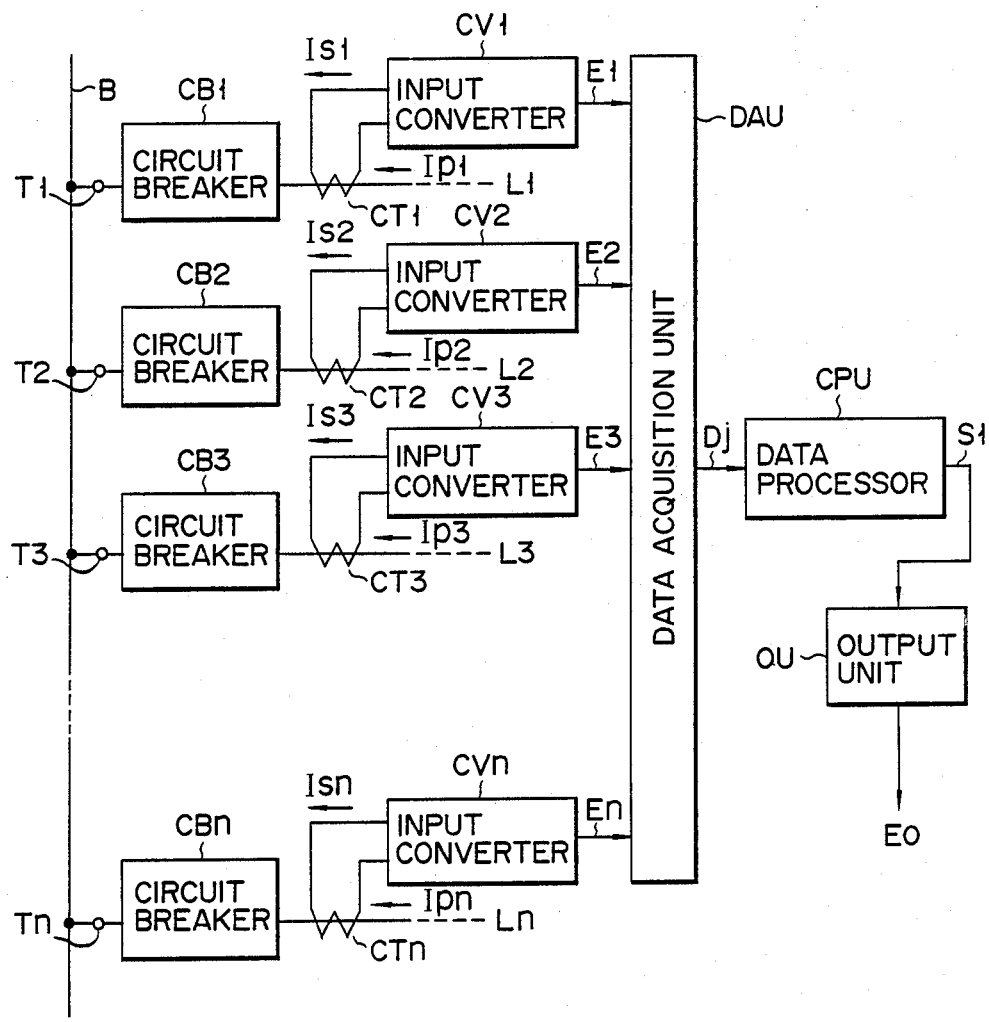
FIG. 17 is a block diagram of an arrangement of hardware according to an embodiment of the present invention.

FIG. 17 is a block diagram of an arrangement of hardware according to the first embodiment of the present invention. In FIG. 17, reference symbol B denotes a bus bar to be protected; CB1, CB2, CB3, and CB4, circuit breakers provided at terminals T1 to Tn of bus bar B; CT1, CT2, CT3, and CTn, current transformers for detecting terminal currents Ip1 to Ipn of bus bar B; CV1, CV2, CV3, and CVh, input converters (current/voltage converters); DAU, a data acquisition unit; CPU, a data processor for calculating f(d), f(r), etc; and OU, an output unit for controlling circuit breakers CB1 to CBn. Secondary currents of transformers CT1 to CTn are supplied to converters CV1 to CVn and are converted into electrical amounts (voltage signals) E1 to En in proportion to secondary currents Is1 to Isn, respectively. Unit DAU samples amounts E1 to En, respectively, at the same time in predetermined time interval $\theta d$, converts the sampled values into digital data, and acquires respective terminal current data $D_j$ (j=1 to n). Processor CPU executes predetermined calculation processing using data $D_j$, and if a processing result corresponds to a predetermined operation condition (i.e., when the generation of inhibit output S2 from comparison processing 4 in FIG. 1 is prevented for one cycle period), processor CPU generates operation signal S1. Unit OU generates operation output Eo when signal S1 is present, or the internal fault occurs. Circuit breakers CB1 to CBn are then operated by output Eo, thereby disconnecting bus bar B from power lines L1 to Ln.

FIG. 18 is a flow chart showing a processing sequence according to the embodiment of FIG. 17. First, in step 6, CPU fetches data $D_j$ and stores it as current sample data $D_{jm}$ (corresponding to prior to processing 2 in FIG. 1). Subsequently, in step 7, CPU calculates currently sampled data Ddm and Drm as basic data respectively of differential current data Dd and restraint data Dr by the following equation (24) and stores them (corresponding to prior processing 1 and processing 2 in FIG. 1).

$$Ddm = D1m + D2m + D3m + \ldots + Dnm$$

$$Drm = |D1m| + |D2m| + |D3m| + \ldots + |Dnm| \qquad (24)$$

where D1m, D2m, D3m, and Dnm are data of the respective terminals of data $D_{jm}$.

After data Ddm and Drm are prepared, in step 8, CPU calculates differential function f(d) and restraint f(r) in accordance with equations (1) and (11), respectively (corresponding to processing 1 and processing 3 in FIG. 1). After this processing, CPU executes comparison processing (corresponding to processing 4 in FIG. 1) in step 9, and executes differential relay processing (corresponding to processing 5 in FIG. 1) in step 10. After these processing operations, CPU rewrites data Djm, Ddm, and Drm in step 11, and the flow returns to step 6. Examples of rewrite processing in step 11 will be shown with reference to the case wherein each of sampling intervals 8d and 8s is a phase angle of 30°. (A description will be made with reference to the case of $\theta d = \theta s = 30°$ hereinafter if otherwise specified).

$$Djm \rightarrow X \qquad (25)$$

$$Ddm \rightarrow Dd(m-1), Dd(m-1) \rightarrow Dd(m-2), \ldots,$$
$$Dd(m-d+1) \rightarrow Dd(m-d)Dd(m-d) \rightarrow X \qquad (26)$$

$$Drm \rightarrow Dr(m-1), Dr(m-1) Dr(m-2) \ldots$$
$$Dr(m-r+1) Dr(m-r)Dr(m-r) \rightarrow X \qquad (27)$$

where X means that data is cancelled and d and r are positive integer constants. Values of constants d and r vary depending on processing contents of steps 9 and 10. However, in the case of this embodiment, assuming that d=6 and r=12, and data of a half cycle (d=6) and of one cycle (r=12) of currents Ip1 and Ipn are stored.

FIGS. 19 shows step 9 in detail. First, in step 9-1, comparison by equation (21) (or (22)) is executed, and if equation (21) (or (22)) is established, a comparison result of step 9-1 is determined as Y. Otherwise, the comparison result is determined as N. If Y in step 9-1, signal S2 is set to be 1 in step 9-2, and if N in step 9-1, step 9 is ended.

FIG. 20 shows step 10 in detail. First, in step 10-1, logical state of signal S2 is checked, and if S2 is 0 (Y) in step 10-1, 1 is added to count value C representing the sampling number in step 10-2, and this added value is used as new count value C. If S2 is 1 (N in step 10-1), value C is corrected to be 0 in step 10-3. After these steps, value C is checked in step 10-4, and if the value is 12 (Y), 1 is subtracted from value C in step 10-5 to obtain new value C and then the flow advances to step 10-6. Note that C=12 represents one cycle (30°×12=360°) of sampling by every 30°.

Then, operation quantity f(0) is calculated in step 10-6, and restraining quantity f(b) is calculated in step 10-7. In addition, quantities f(0) and f(b) are compared with each other in step 10-8. If a comparison result corresponds to an operation condition of equation (30) to be described later, the comparison result is determined to be Y. Otherwise, the comparison result is determined to be N. If Y in step 10-8, signal S1 is set to be 1 in step 10-9. If value C is not 12 (N) in step 10-4, signal S1 is set to be 0 in step 10-10. If signal S1 is 1, output Eo is generated from unit OU in FIG. 17 to instruct interruption of circuit breakers CB1 to CBn.

Although processing in steps 10-6 to 10-8 described above is known in a conventional relay, examples thereof will be described below. (cf. IEEE Trans. PAS-100 No. 5, May '81 PP2390-2398; and IEEE Trans. PAS-101 No. 10, Oct. '82 PP4164-4170.) Quantity f(o) in step 10-6 and quantity f(b) in step 10-7 are respectively calculated by, e.g., the following equations:

$$f(o) = \sum_{n=0}^{5} |Dd(m-n)| \qquad (28)$$

$$f(b) = \text{Maximum Value of}$$

$$Dr m, Dr(m-1) \ldots Dr(m-11) \quad (29)$$

Equation (28) is a sum of absolute values of data Dd during the previous half cycle, and equation (29) is a maximum value of data Dr during the previous one cycle. In addition, in step 10-8, when, e.g., the following equation is established, this is used as an operation condition:

$$\text{Sum (or Maximum Value) of K4 and } f(o) \geq K3 f(b) \quad (30)$$

where K3 and K4 are positive constants.

In the embodiment shown in FIGS. 18 to 20, data Dr and function f(r) are respectively given by equations (1), (5), and (11), signal S2 is generated when equation (21) or (22) is established, and when signal S2 is generated, an operation of differential relay processing 5 in FIG. 1 is inhibited so as not to generate signal S1 in FIG. 17. Although signal S2 is generated only every cycle of terminal current Ip, when signal S2 is 1, value C is set to be 0 in step 10-3. On the other hand, even when signal S2 is 0, value C is incremented by 1 for each sample in step 10-2. Since the sampling interval is set to be 30°, 1 cycle is required until value C reaches 12 (30°×12=360°=1 cycle) and inhibition of differential relay processing 5 is cancelled. By this inhibition of 1 cycle, differential relay processing 5 is prevented from being erroneously performed due to the external fault.

In addition, during the normal operation, data Dd is zero and data Dr is a small value by a load current. For this reason, equation (21) or (22) is established, signal S2 is set to be 1, and value C is set to be 0. In this state, when the internal fault of bus bar B occurs, signal S2 is immediately set to be 0 (Y in step 10-1 of FIG. 20), value C reaches 12 after 1 cycle (Y in step 10-4 of FIG. 20), so that operation inhibition of differential relay processing is cancelled (step 10-9 of FIG. 20) to execute the protection operation of bus bar B.

[Second Embodiment]

In the second embodiment, only step 10 of the first embodiment (FIG. 18) is changed, and step 10 of the second embodiment is shown in FIG. 21. In FIG. 21, the same operations as in FIG. 00 are denoted by the same reference symbols. In step 10-11, the value of operation quantity f(o) is set to be zero.

First, processing in steps 10-1 to 10-4 is executed as in FIG. 20. When value C is 12, processing after step 10-4 is the same as that in FIG. 20. When value C does not reach 12 (N in step 10-4), quantity f(o) is set to be zero in step 10-11, and then processings after step 10-7 are executed as in the case of FIG. 20.

In this embodiment, when value C is not more than 12, quantity f(o) is set to be zero so that a processing result in step 10-8 is determined to be N and signal S1 is set to be 0 as in the case of the first embodiment (FIG. 18). In addition, when value C reaches 12, the processing is the same as that of the first embodiment. Therefore, signal S1 of the second embodiment is operated in the same manner as that of the first embodiment.

Note that when value C is 12, quantity f(o) may be changed to be zero or a very small value in step 10-6 of FIG. 21 or restraining quantity f(b) may be changed to be a very large value in step 10-7, so that the processing result in step 10-8 is determined to be N. Such a process can be easily realized by changing the calculation value of amount f(o) in step 10-6 or the calculation value of amount f(b) in step 10-7 when value C is 12, so that a detailed description thereof will be omitted.

[Third Embodiment]

Figure 22:
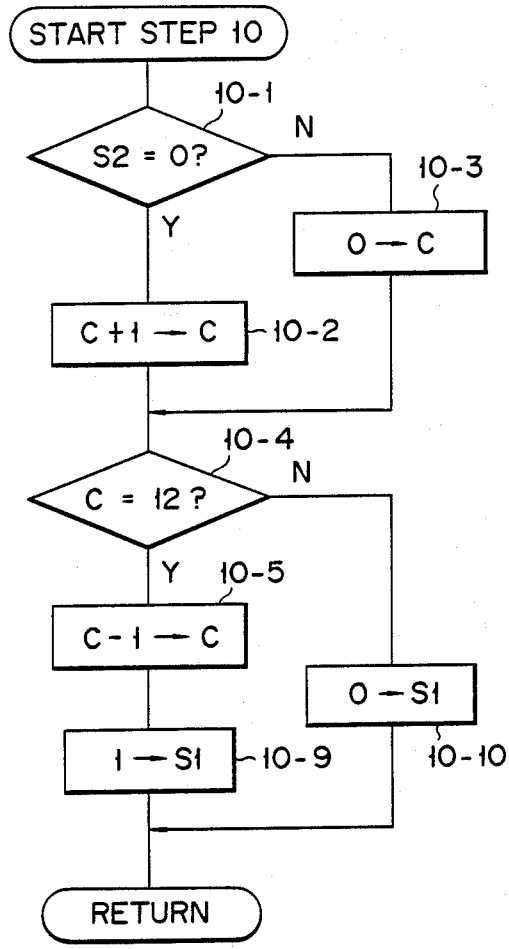
FIG. 22 is a flow chart showing still another processing sequence of step 10 of FIG. 18 in detail.

In the third embodiment, only step 10 of the first embodiment (FIG. 18) is changed, and FIG. 22 shows processing of the third embodiment. In FIG. 22, the same operations as in FIG. 20 are denoted by the same symbols.

First, steps 10-1 to 10-4 are executed as in FIG. 20. When value C is 12, 1 is subtracted from value C to obtain new count value C in step 10-5, and then signal S1 is set to be 1. When value C is not more than 12, signal S1 is set to be 0.

A difference of the third embodiment (FIG. 22) with respect to the first embodiment (FIG. 21) is that when value C is 12, processing in steps 10-6 to 10-8 of FIG. 20 is not executed and signal S1 is directly set to be 1. This will be described below.

As has been described in the Summary of the Invention, signal S2 is continuously 0 during the internal fault (Y in step 10-1 of FIG. 22). For this reason, when 1 cycle has elapsed after the internal fault occurs, value C reaches 12 (Y in step 10-4), and signal S1 is set to be 1 (step 10-9).

On the other hand, during the external fault, signal S2 is set to be 1 at least once a cycle (N in step 10-1) even when the current transformer is magnetically saturated, so that value C does not reach 12 (step 10-3). During the normal operation, current Id is continuously zero, and respective terminal currents Ij are load currents. This state is the same as that of the external fault without saturation of the current transformer, and in which the value of differential function f(d) is zero and restraint function f(r) presents a small value by the load current. Even when all currents Ij are set to be zero and the value of function f(r) is set to be zero, current Id is also zero and the value of differential function f(d) is also zero. In either case, equation (21) or (22) is continuously established and signal S2 is continuously 1, so that value C does not reach 12.

As described above, value C reaches 12 only by the internal fault, so that signal S1 is set to be 1 during the internal fault. Therefore, the third embodiment can be operated in the same manner as that of the first embodiment (wherein FIG. 20 is adapted in place of FIG. 22).

Note that as an intervening embodiment between the third and first embodiments, quantity f(b) of equation (30) may be set to be zero. This intervening embodiment can be easily realized by adopting a manner wherein restraint quantity f(b) is set to be zero while step 10-7 in FIG. 20 is omitted, and applying it to the first embodiment. Thus, a detailed description thereof will be omitted.

[Fourth Embodiment]

In the fourth embodiment, steps 9, 10, and 11 of the first embodiment are changed. This will be described below.

Figure 23:
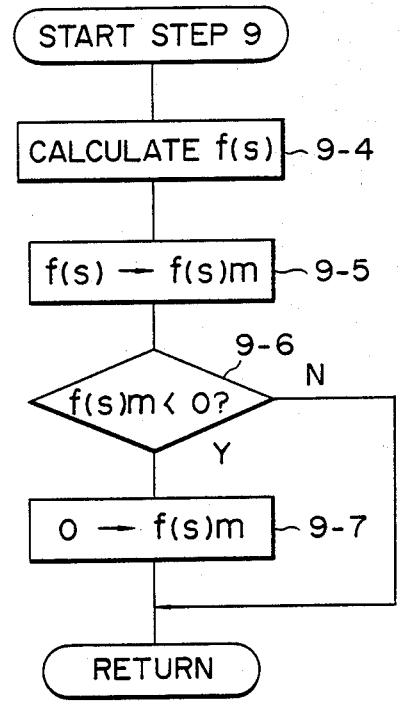
FIG. 23 is a flow chart showing another processing sequence of step 9 of FIG. 18 in detail.

FIG. 23 shows step 9 of the fourth embodiment. First, inhibit function f(s) is calculated by equation (23) in step 9-4, and this value is stored as current inhibit function f(s)m in step 9-5. Then, the value of f(s)m is checked in step 9-6. If the value is negative in step 9-6, the value of f(s)m is corrected to be zero, and if the value is positive in step 9-6, it is not corrected. Thus, step 9 is ended.

Figure 24:
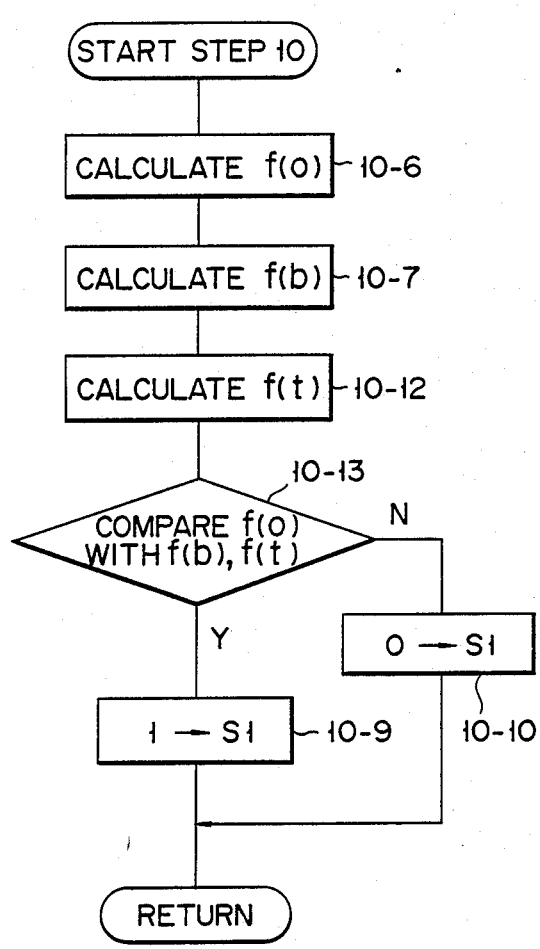
FIG. 24 is a flow chart showing still another processing sequence of step 10 in detail.

FIG. 24 shows step 10 of the fourth embodiment. In FIG. 24, the same operations as in FIG. 20 are denoted by the same reference symbols. First, in steps 10-6 and 10-7, the values of operation quantity f(o) and restraining quantity f(b) are calculated on the basis of equations (28) and (29) as in the first embodiment. Then, inhibit quantity f(t) is calculated by the following equation in step 10-12:

f(t) = Maximum Value (or Sum) of $$f(s)m, f(s)(m-1), \ldots f(s)(m-11) \quad (31)$$

where values of $f(s)(m-1) \ldots f(s)(m-11)$ are the (1 .. . 11)th preceding values from the current value of function f(s). The value of f(t) is a maximum value (or sum of positive values) of the values of function f(s) during the previous 1 cycle.

Thereafter, comparison is executed in step 10-13. If the following equation is established, a comparison result is determined to be Y. Otherwise, the comparison result is determined to be N.

f(o) ≧ Sum (or Maximum Value) of $$K3f(b), K5f(t) \text{ and } K4 \quad (32)$$

where K5 is a positive constant.

If Y in step 10-13, signal S1 is set to be 1 in step 10-9, and if N in step 10-13, signal S1 is set to be 0 in step 10-10, thereby ending step 10.

In next step 11 (FIG. 18), the values of functions f(s)m, f(s)(m−1) ... f(s)(m−11) are written like other data Djm, Ddm, and Drm.

In the fourth embodiment (FIG. 23), the erroneous operation of differential relay processing 5 is inhibited by function f(s), while the erroneous operation is inhibited by inhibit signal S2 in the first to third embodiments. In the case of the external fault, signal S2 is set to be 1 at least once a cycle, and similarly, function f(s) is set to be a positive value once a cycle. For this reason, quantity f(t) of equation (31) is always a positive value. Therefore, if constant K5 of equation (32) is set to be a very large value, equation (32) is not established and signal S1 is not set to be 1.

In addition, in the case of the internal fault, function f(s) is continuously negative as signal S2 is continuously 0. For this reason, quantity f(t) is always zero, and processing in step 10-13 becomes the same as that in step 10-8 regardless of the value of constant K5 of equation (32). Therefore, signal S1 is set to be 1 as in the case of the first embodiment (FIG. 20).

As described above, the fourth embodiment (FIGS. 23 and 24) can be applied like the first embodiment. Note that when the value of constant K5 of equation (32) is infinite, the same effect can be obtained as that in the case wherein the operation of differential relay processing 5 is inhibited by signal S2.

[Fifth Embodiment]

In the above embodiments, the inhibit output (S2 or f(s)) is generated during the normal operation, and this inhibit output is held in 1 cycle of terminal current Ip. For this reason, differential relay processing 5 cannot be performed during 1 cycle even when the internal fault occurs, so that a delay of 1 cycle is generated in the relay operation. The fifth embodiment eliminates this operation delay.

Figure 25:
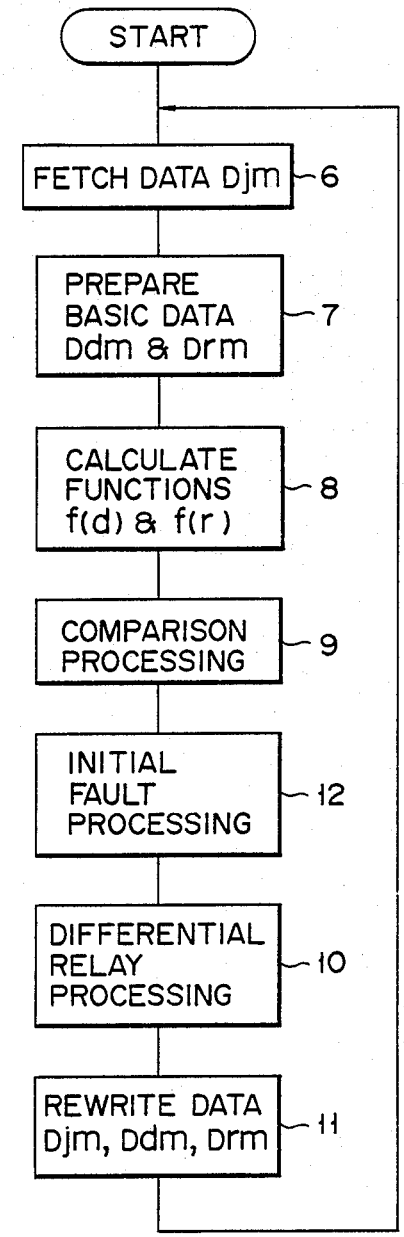
FIG. 25 is a flow chart showing another processing sequence for the embodiment of FIG. 17.

FIG. 25 shows processing of the fifth embodiment. FIG. 25 is the same as FIG. 18 except that initial fault processing is added between steps 9 and 10. In addition, steps except step 12 are executed in the same manner as those of the first embodiment (FIG. 18).

Figures 26, 28:
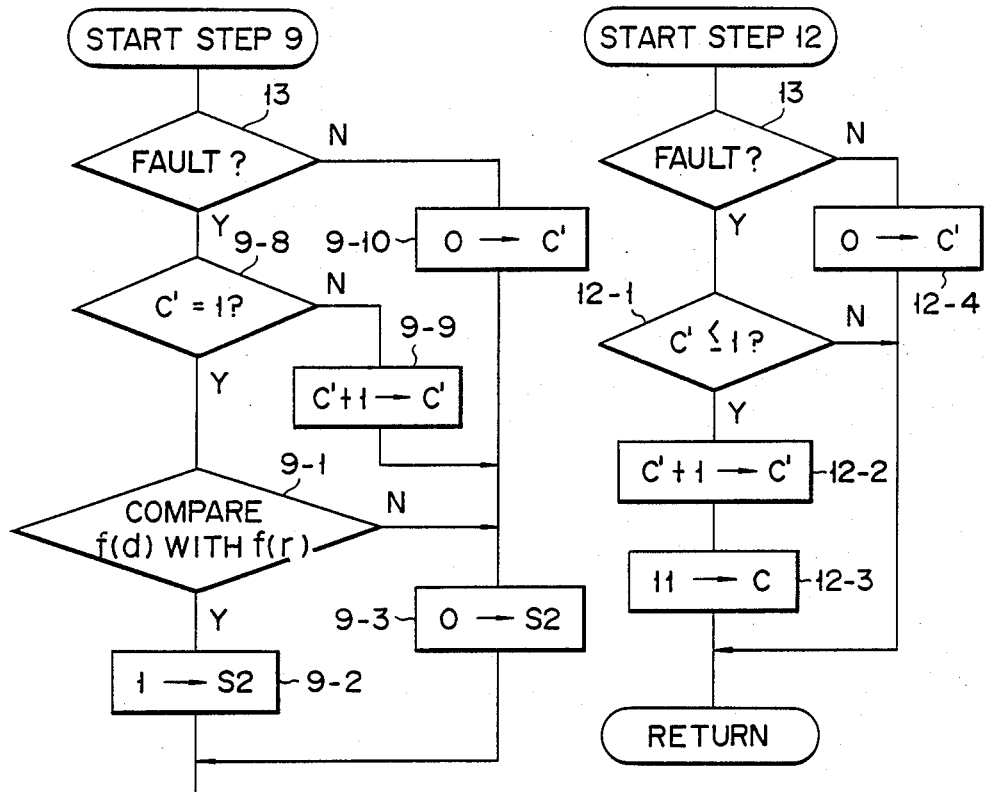
FIG. 26 is a flow chart showing step 12 of FIG. 25 in detail.
FIG. 28 is a flow chart showing step 9 of FIG. 25 in detail.

FIG. 26 shows step 12 in detail. First, in step 13, fault detection is executed (to be described in detail later with reference to FIG. 27). If the fault is detected in step 13, a processing result is determined to be Y. Otherwise, the processing result is determined to be N. If Y in step 13, count value C′ of the sampling number is checked in step 12-1. If value C′ is 1 or less, 1 is added to value C′ to obtain new count value C′. In addition, in step 12-3, count value C used in following step 10 is corrected to be 11, thereby ending step 12.

If value C′ exceeds 1 in step 12-1, step 12 is ended. If N in step 13, value C′ is corrected to be 0 in step 12-4, thereby ending step 12. In these cases, value C is not corrected (step 12-3).

More specifically, when the fault detection is not executed in step 12, value C′ is always 0. When the fault detection is executed, 1 is added to value C′, and when value C′ is set to be 2, this addition is not executed. Only when the fault detection is executed and value C′ is 0 or 1, value C of step 10 is corrected to be 11. That is, only when the initial and next sampling operations after the fault detection are executed, value C is corrected to be 11.

Figure 27:
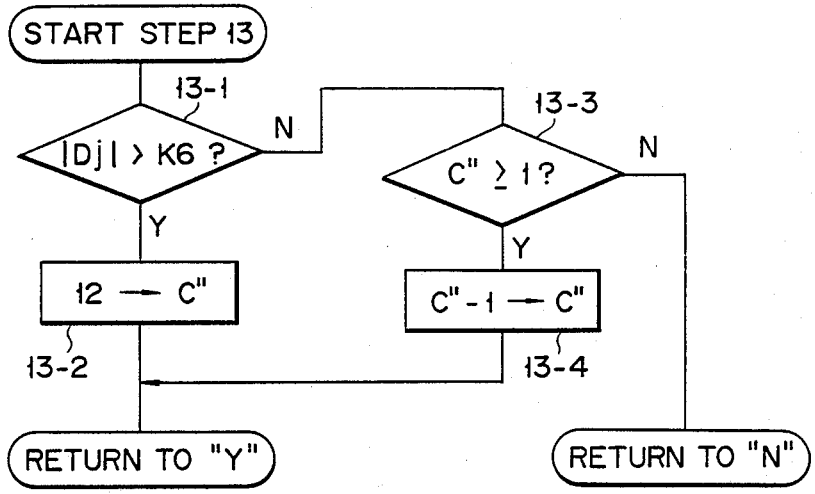
FIG. 27 is a flow chart showing step 13 of FIG. 26 in detail.

FIG. 27 shows step 13 in detail. First, in step 13-1, comparison processing is executed. If the following equation is established, a comparison result is determined to be Y. Otherwise, the comparison result is determined to be N:

$$\text{Maximum Value of } |Dj| \geq K6 \quad (33)$$

where K6 is a positive constant. If Y in step 13-1, count value C″ of the sampling number is set to be 12 in step 13-2, and the processing result is determined to be Y to set a fault detection state. If N in step 13-1, value C″ is checked in step 13-3. If C″ ≧ 1, 1 is subtracted from value C″ in step 13-4 to obtain new count value C″, and the processing result of step 13 is determined to be Y. If value C″ is not more than 1, i.e., 0 in step 13-3, the processing result of step 13 is determined to be N. At this time, value C″ is not changed.

In the above processing, if the value of constant K6 is set to be slightly larger than the maximum value of absolute value |Dj| of the respective current data obtained when the load current is maximum, equation (33) is not established during the normal operation. In addition, during the external fault wherein the normal internal fault and sauration of the current transformer may occur, equation (33) is established at least once a cycle, so that the comparison result of step 13-1 is determined to be Y. If Y in step 13-1, value C″ is 1 or more during one cycle, and the processing result of step 13 is determined to be Y. Therefore, during the external fault wherein the normal internal fault and saturation of the current transformer may occur, the processing result of step 13 is continuously Y, thereby setting the state wherein the fault is detected.

An overall operation of the fifth embodiment will be described below. In the processing of the fifth embodiment, only processing operations executed at initial and next sampling times (to be referred to as sampling times f1 and f2 hereinafter) after the fault detection are different from those of the first embodiment. In the processing at these sampling times, value C is 11. Therefore, if signal S2 is 0, value C is set to be 12 in step 10-2, and processing in step 10-5 and the subsequent steps is executed. In addition, if signal S2 is 1, value C is returned to 0 in step 10-3.

Processing at sampling times after time f2 is executed in the same manner as in the first embodiment, and when signal S2 is set to be 0, value C is sequentially incremented by 1. That is, in the processing at initial and next sampling times f1 and f2 after the fault detection, if signal S2 is 0, processing in step 10-5 and the subsequent steps is immediately executed regardless of preceding signal S2. If signal S2 is 1 at time f2, the following processing is the same as that in the first embodiment. Therefore, even when signal S2 is set to be 0, 1 cycle is required for value C to reach 12. At this time, the processing in step 10-5 and the subsequent steps is not executed and signal S2 is set to be 0.

In the case of the external fault, as shown in FIGS. 4A, 4B, and 4D, differential current Id rises after terminal current Ii has risen. At this time, signal S2 is 1, and signal S2 is 1 at least in processing at times f1 and f2. For this reason, differential relay processing 5 is not erroneously performed at times f1 and f2, and is not erroneously performed in processing after time f2 as in the first embodiment.

In the case of the internal fault, current Id rises at the same time current Ii rises. For this reason, signal S2 is set to be 0 at least at time f2, and processing in step 10-5 and the subsequent steps is executed. Therefore, a processing result in step 10-8 is determined to be Y and signal S1 is set to be 1, thereby executing the protection operation of bus bar B.

As described above, according to the fifth embodiment, if signal S2 is 0 only at initial and next times f1 and f2 after the fault detection, value C is set to be 11 so that holding of the state wherein signal S1 is 1 is eliminated, thereby protecting the internal fault at high speed without a delay of 1 cycle.

Addition of initial fault processing 12 can be applied to the second and third embodiments, so that the apparatus can be protected from the internal fault at high speed without the false operation during the external fault.

Note that in step 13-1, it is detected that the value of data Dr of equation (6) is set to be a predetermined value or more. However, it may be detected that data Dr of equation (5) or a maximum value of data Dr1 and −Dr2 of equation (7) is set to be a predetermined value or more, so that the fault can be similarly detected.

[Sixth Embodiment]

The sixth embodiment provides a second means capable of protecting the internal fault at high speed. In the sixth embodiment, only step 9 of the first embodiment (FIG. 18) is changed. FIG. 28 shows step 9 in detail.

In step 9 in FIG. 28, the fault detection is first executed in step 13. If the fault is detected and a processing result is determined to be Y, count value C' is checked in step 9-8. If C'=1, processing in step 9-1 and the subsequent steps is executed in the same manner as in the first embodiment (FIG. 19).

If value C' is not 1 in step 9-8, 1 is added to value C' in step 9-9 to obtain new count value C', and signal S2 is set to be 0 in step 9-3. In addition, if the fault detection is not executed in step 13 and the processing result is determined to be N, value C' is corrected to be 0 in step 9-10, and signal S2 is set to be 0 in step 9-3.

In step 9 of the sixth embodiment, signal S2 is 0 and value C' is 0 when the fault detection is not executed.

Since value C' is 0 (N in step 9-8) at time f1 when the fault is detected, value C' is set to be 1 (step 9-9), and signal S2 remains 0 (step 9-3). Since value C' is 1 (Y in step 9-8) at next time f2, processing in step 9-1 and the subsequent steps is executed. That is, the processing is executed and signal S2 is set to be 1 at time f2 and thereafter, and signal S2 is 0 when the fault detection is not executed and at time f1.

An operation of the sixth embodiment will be described below. During the normal operation, although signal S2 is 0, differential current Id is also a small value. Therefore, in step 10 of FIG. 20, a processing result is determined to be N in step 10-8, so that signal S2 is 0. During the external fault, current Id does not rise until time f2 even if the current transformer is saturated, so that the processing result in step 10-8 remains N. In addition, the processing result in step 9-1 is determined to be Y at time f2, signal S2 is set to be 1. For this reason, processing after time f2 is executed in the same manner as in the first embodiment, so that signal S2 is not set to be 1.

During the internal fault, the processing result in step 9-1 is continuously N after time f2. For this reason, signal S2 is continuously 0 before the fault, value C in step 10 is continuously 12 when step 10-4 is executed. At this time, step 10-8 is continuously executed. In step 10-8, the processing result is determined to be Y immediately after occurrence of the internal fault, so that the high-speed operation can be achieved.

As described above, according to the sixth embodiment, signal S2 is inhibited to be 1 when the fault detection is not executed and also at the timing of f1 sampling immediately after the fault detection, so that line B can be protected from the internal fault at high speed without a delay of 1 cycle. Such a means can be applied to the second embodiment, so that the false operation can be prevented during the external fault, and bus bar B can be protected from the internal fault at high speed.

In the fifth embodiment, when signal S2 is 1 at time f2 and thereafter, signal S2 is kept to be 1. In the sixth embodiment, signal S2 can be set to be 1 at time f2 and thereafter. A sampling time immediately after the fault detection, from which the above control is executed, can be changed within the range not exceeding the nonsaturation interval (tl in FIG. 4) of the current transformer at the initial period of the external fault.

[Seventh Embodiment]

Figure 29:
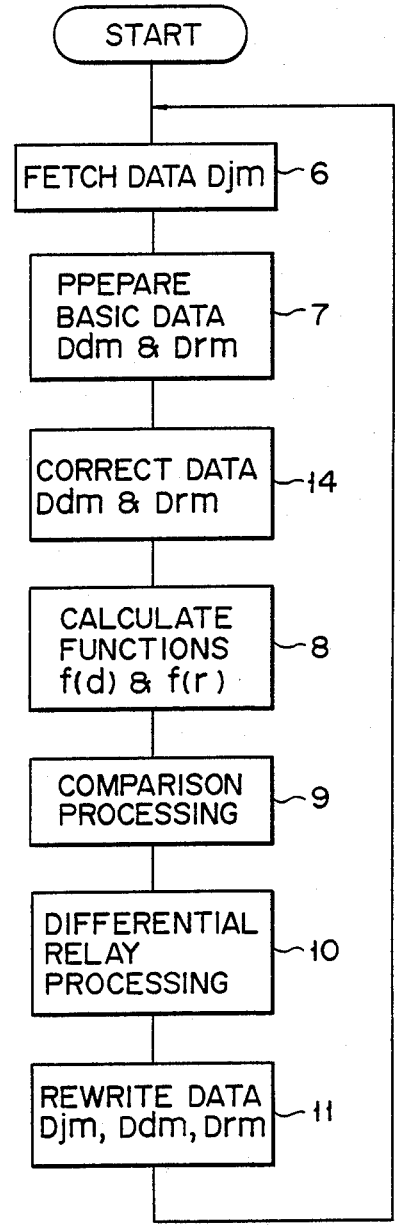
FIG. 29 is a flow chart showing still another processing sequence for the embodiment of FIG. 17.

The seventh embodiment provides a third means capable of protecting the internal fault at high speed. FIG. 29 shows processing of the seventh embodiment. FIG. 29 is the same as FIG. 18 except that data correction step 4 is added after step 7. The seventh embodiment is the same as the first embodiment except that step 14 is added and step 9 is changed as will be described later.

Figure 30:
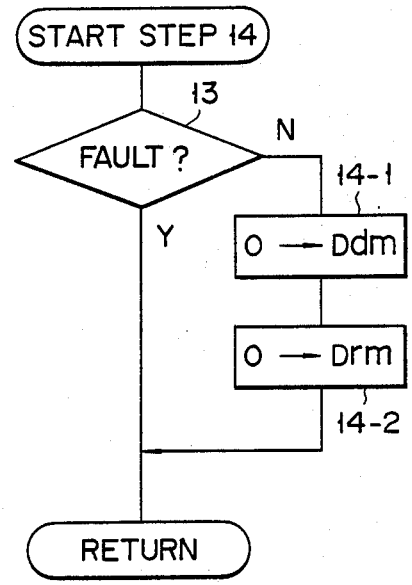
FIG. 30 is a flow chart showing step 14 of FIG. 29 in detail.

FIG. 30 shows step 14 in detail. First, step 13 is executed to detect the fault. If Y in step 13, step 14 is ended. If the fault detection is not executed and the processing result is determined to be N in step 13, the values of data Ddm and Drm are corrected to be zero in steps 14-1 and 14-2, thereby ending step 14.

Comparison processing in step 9 is executed in the same manner as in the first embodiment (FIG. 19) except that constant K2 of equation (21) is used as a negative constant. An absolute value of constant K2 is set to be a sufficiently small value so as to be neglected with respect to the value of restraint function f(r) during the fault.

In the seventh embodiment, differential function f(d) and restraint function f(r) are calculated using only data after the fault detection. Since all the values of data are zero and constant K2 of equation (21) is negative before the fault detection, signal S2 is 0. For this reason, in the case of the internal fault, step 10-13 is immediately executed to set signal S1 to be 1, thereby protecting the internal fault at high speed. In the case of the external fault, the fault detection is executed and at the same time signal S1 is set to be 1, so that the false operation of the differential relay means caused by saturation of the current transformer is inhibited.

As described above, according to the seventh embodiment, functions f(d) and f(r) are calculated using only the data after the fault detection, thereby protecting the apparatus from the internal fault at high speed. A similar means can be applied to the second and fourth embodiments, so that the apparatus can be similarly protected from the internal fault at high speed. In the fourth embodiment, the value of function f(s) in equation (23) is zero before the fault detection. For this reason, inhibit quantity f(t) in equation (31) is calculated only by the data after the fault detection, and is not set to be a positive value immediately after the fault in the case of the internal fault, thereby protecting the apparatus from the internal fault at high speed.

[Eighth Embodiment]

In the eighth embodiment, steps 7, 13, and 11 of the fifth embodiment are changed as follows. In step 7, data Dpm and Dnm in addition to data Ddm and Drm in equation (24) are calculated and stored by the following equation:

$$Dpm = \sum_{j=1}^{n} (Djm)p \quad (34)$$

$$Dnm = \sum_{j=1}^{n} (Djm)n \quad (35)$$

where $(Djm)p$ and $(Djm)n$ are respectively obtained by correcting negative values and positive values of currently sampled data Djm of terminal current data Dj, and data Dpm and Dnm are respectively sums of positive and negative values of currently sampled data Djm.

Figure 31:
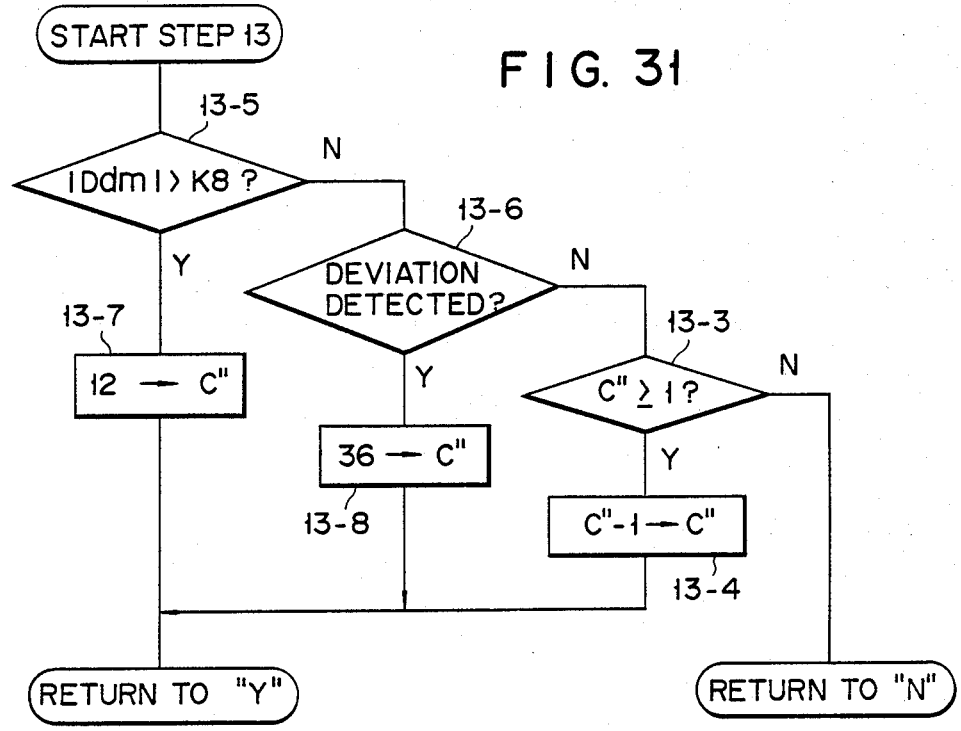
FIG. 31 is a flow chart showing step 13 of FIG. 30 in detail.

FIG. 31 shows step 13 of the eighth embodiment in detail. First, in step 13-5, the value of data Ddm is checked. If the following equation is established, the processing result is determined to be Y, and if otherwise, the processing result is determined to be N.

$$|Ddm| \geq K8 \quad (36)$$

where K8 is a positive constant.

If Y in step 13-5, count value C'' is set to be 12 in step 13-7, so that the processing result in step 13 is determined to be Y. If N in step 13-5, a change in step 13-6 is detected. If the following equation is established, the processing result is determined to be Y. Otherwise, the processing result is determined to be N:

$$(37)$$

(Maximum Value of $Dpm$ and $-Dnm$) ≥ [Sum or Maximum Value of $K9$ {Maximum Value of (Maximum Value of $Dp(m - 1), Dp(m - 2) \ldots Dp(m - 12)$) and (Maximum Value -continued
of $-Dn(m - 1), -Dn(m - 2) \ldots -Dn(m - 12)$)}]

where K9 is a constant of 1 or more and K10 is a positive constant.

If Y in step 13-6, value C'' is set to be 36 in step 13-8, the processing result in step 13 is determined to be Y. If N in step 13-6, value C'' is checked in step 13-3. If C'' is 1 or more, 1 is subtracted from value C'' in step 13-4 to obtain new count value C'', and the processing result in step 13 is determined to be Y. If C'' is not more than 1, i.e., 0 in step 13-3, the processing result in step 13 is determined to be N without changing value C''.

[Ninth Embodiment]

In the above embodiments, the description has been made with reference to only the case wherein differential function f(d) is given by equation (1), restraint data Dr is given by equation (5), and restraint function f(r) is given by equation (11). Since the above factors can be easily changed to other equations by the above embodiments, a detailed description and a flow chart thereof will be omitted for the sake of simplicity.

That is, in order to change function f(d) to equation (2) or (4), function processing in step 8 (FIG. 18) need only be changed to equation (2) or (4) instead of equation (1). In order to change data Dr to equation (6), (7), (8), (9), or (10), data of each equation is calculated by the basic data preparation processing in step 7, and the data is processed by the data rewrite processing in step 11 as in the first embodiment. In addition, function f(r) is changed to equation (12) or (13), or to equation (15) or (16) using auxiliary function f(r1) of equation (17), (18), or (19) as follows. That is, after necessary data Dr is calculated in step 7 as described above, function f(r1) and the like and function f(r) are obtained by function calculation step 8.

[Tenth Embodiment]

In the tenth embodiment, only the function calculation processing in step 8 and the comparison processing in step 9 are different from those of the first embodiment. That is, functions of the following equations are calculated in step 8:

$$f(d) = |Ddm - Dd(m-1)| \quad (38)$$

$$f(r) = |Drm - Dr(m-1)| \quad (39)$$

Equation (38) equals to equations (1), (2), and (4) obtained when predetermined number p is set to be 2, and equation (39) equals to equations (11), (12), and (13) obtained when number p is similarly set to be 2.

Figure 32:
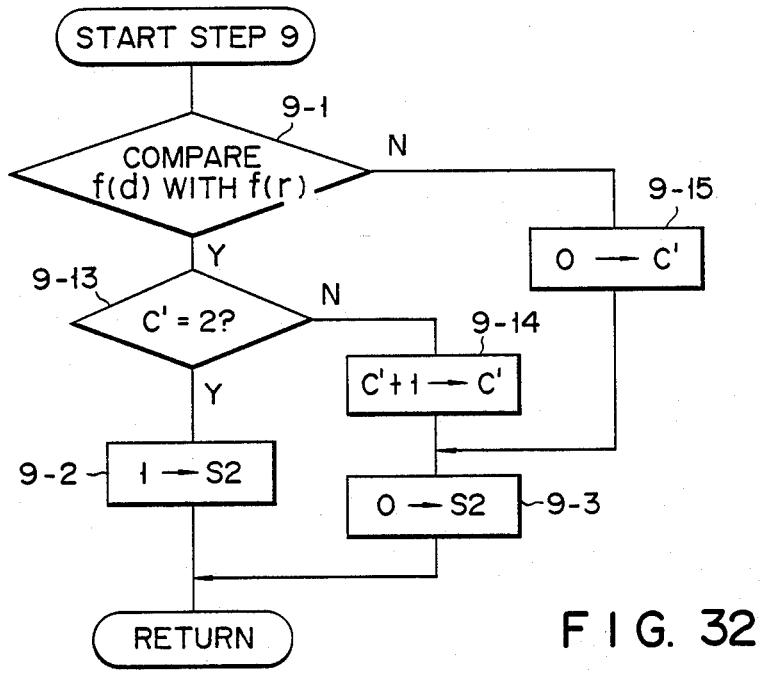
FIG. 32 is a flow chart showing step 9 of FIG. 29 in detail.

FIG. 32 shows step 9 in detail. First, step 9-1 is executed by equation (21) or (22) as in the first embodiment. If Y in step 9-1, connt value C' is checked in step 9-13. If value C' is 2 (Y) in step 9-13, signal S2 is set to be 1 in step 9-2. If value C' is not 2 (N) in step 9-13, 1 is added to value C' to obtain new count value C' in step 9-14, and signal S2 is set to be 0 in step 9-3. If N in step 9-1, value C' is corrected to be 0 in step 9-15, and signal S2 is set to be 0 in step 9-3.

In the above processing, when the processing result is continuously determined to be Y in step 9-1, signal S2 is kept to be 1 during the continuous Y state from the second time. Otherwise, signal S2 is set to be 0.

In the case of the tenth embodiment, even when the current transformer is saturated due to the external fault, a difference between the maximum and minimum values of 3 values of data Dd is almost zero as represented by function f(d) in FIG. 4. Therefore, the value of function f(d) of equation (38) is continuously set to be zero at least twice. For this reason, the processing result in step 9-1 is continuously set to be 1 at least twice, so that signal S2 is set to be 1.

In addition, in the case of the internal fault, the value of function f(d) of equation (38) sampled around the peak of the differential current waveform is sometimes zero. However, this phenomenon does not consecutively occur twice, so that the value of function f(d) of equation (38) is sufficiently increased at the next sampling. For this reason, the processing result in step 9-1 is not consecutively determined to be Y twice, so that signal S2 is not set to be 1.

As described above, according to the tenth embodiment, the inhibit output is not generated due to the internal fault, and is reliably generated due to the inhibit output. Therefore, the tenth embodiment can be similarly applied like the other embodiments.

A means for generating the inhibit output when equation (21) or (22) is consecutively established a plurality of times can be applied if number p is 3 or more.

In addition, when number p is set to be 2 and inhibit function f(s) of equation (23) is to be obtained, function f(s) is obtained by equation (23) from the values of the functions of equations (38) and (39). However, the value of function f(s) used in differential relay processing 10 in FIG. 18 etc. is actually the minimum value of the value of equation (23) at, e.g., consecutive two sampling times. This is because the value of function f(d) is sometimes decreased and hence the value of function f(s) is increased, although not continuously, at the peak of the waveform during the internal fault while the value of function f(d) is continuously and significantly decreased at least once a cycle and hence the value of function f(s) is continuously increased during the external fault. The value of function f(s) can be obtained from a plurality of values of equation (23) when number p is 3 or more.

[Eleventh Embodiment]

In the above embodiments, data of predetermined number p used for calculating differential function f(d) and restraint function f(r) are all sampled continuously in sampling interval $\theta$s. However, functions f(d) and f(r) obtained by combinations of given p data in continuously sampled data of more than p may be used. If the inhibit output is generated by either of the combinations, it may be used as the inhibit output in step 9 (a flow chart is omitted).

In order to simplify this method, assume that, e.g., p=3, and each function is calculated using given 3 data out of 4 data. As a result, the following method can be obtained. That is, 3 data are selected from 4 data to obtain the value of function f(d) of equation (1) etc., and then the values of function f(d) are sequentially and similarly obtained by combining the 3 data. The extreme minimum value of the values of functions f(d) is obtained, and function f(r) is obtained using the 3 data by which the extreme minimum value is given. Then, processing in step 9 is executed using the values of these functions.

In addition, functions f(d) and f(r) may be respectively obtained by two combinations of 3 data out of 4 data Dd except the maximum value and 3 data thereof except the minimum value. Then, presence/absence of the inhibit output is checked for the respective functions. If the inhibit output is obtained from either of the respective functions, it may be used as the inhibit output in step 9.

In this case, a change in data Dd is small in 3 data which are consecutive at least during the external fault, so that the inhibit output can be obtained. On the other hand, since the change is small in 2 data but is large in the other data during the internal fault, the inhibit output similar to that obtained by using the 3 consecutive samples can be obtained.

[Twelfth Embodiment]

Figure 33:
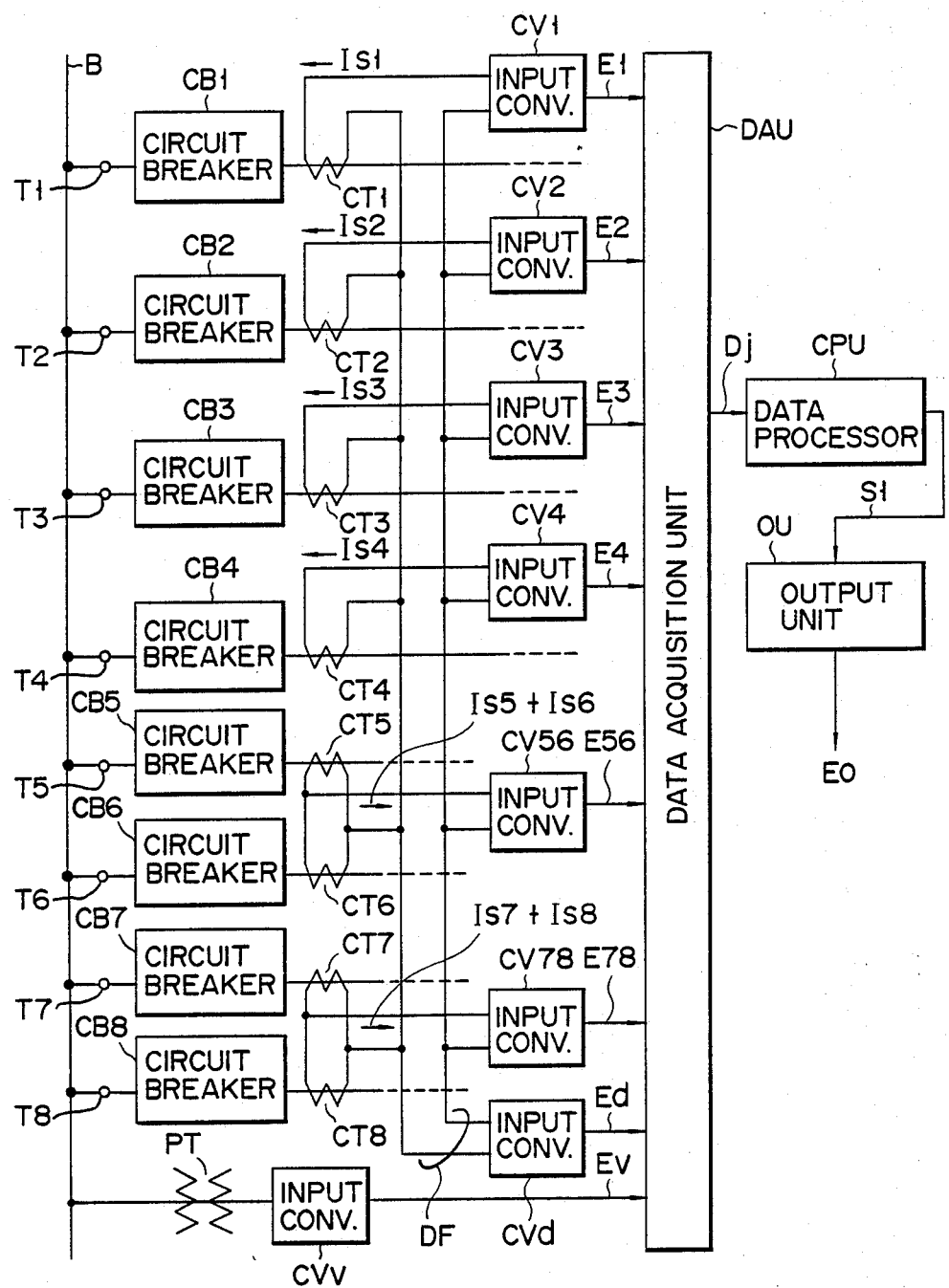
FIG. 33 is a block diagram of an arrangement of hardware according to another embodiment of the present invention.

In the twelfth embodiment, a hardware arrangement and steps 6 and 11 are different from those of the above embodiments. FIG. 33 shows the hardware arrangement of the twelfth embodiment. In FIG. 33, the same parts as in FIG. 17 are denoted by the same symbols. In addition, parts denoted by the same symbols such as CB and CT with different suffixes 4, 5, 6, and the like are the same units. In FIG. 33, PT is a potential transformer, and DF is a differential circuit.

Differences of the twelfth embodiment with respect to the above embodiments are as follows:

(i) Differential circuit DF is arranged, and differential current Id is converted into electrical amount Ed by input converter CVd and supplied to data acquisition unit DAU.

(ii) A voltage of bus bar B is applied to converters CVv through transformer PT and converted into electrical amount Ev, and then applied to uiit DAU.

(iii) Secondary circuits of current transformers CT5 and CT6 and transformers CT7 and CT8 are respectively connected in parallel. Sums of secondary currents are supplied to converters CV5 and CV6 and converted into electrical amounts E5 and E6, respectively, and then supplied to unit DAU.

By the above differences, differential current data Dd can be directly acquired from amount Ed by unit DAU. Therefore, unlike in the above embodiments, calculation of data Dd in step 6 (FIG. 18) is omitted. In addition, data Dv from amount Ev is fetched in step 6 and rewritten in step 11. This data is used when the insufficient voltage relay processing such as equation (37) is to be executed in failure detection step 13 as described in the eighth embodiment. The differences between this embodiment and the first embodiment are as described above.

In the twelfth embodiment, data D1 to D6 obtained by converting amounts E1 to E6 into digital data are acquired and used as data Dj. Data D5 and D6 are respectively data of sums of currents of 2 terminals. Thus, in the case wherein data of a sum of currents of some terminals is acquired, it is called as the respective terminal current data in the present invention.

Terminals used for the acquisition of data of a sum of currents, such as data D5 and D6 as described above, as respective terminal current data Dj, are primarily limited to the non-power source terminal (or the equivalent thereto). In the case of the non-power source terminal, a current during the fault, except a case wherein the fault occurs outside the terminal and the fault current flows therein, can be neglected with respect to currents of the other terminals. Therefore, in the case other than that wherein the fault current flows therein, almost no difference is present in contribution with respect to function f(r) using either of individual data or data of a sum of the terminal currents. In addition, when the fault current flows out, a waveform of the current of a sum is substantially the same as that of the individual current. Therefore, the value of function f(r) obtained by using data of the current sum is substantially the same as that obtained by using data of the individual current. Because of the above relationship, even when the data of the current sum of some terminals is acquired as data Dj in accordance with the condition of the protection zone, function f(r) is substantially the same as that obtained in the case wherein data Dj are individually obtained.

In addition, data Dd is directly acquired from current Id as in the twelfth embodiment only by changing an acquiring means of data Dd.

As described above, the hardware arrangement shown in FIG. 33 can be applied to the above embodiments like that shown in FIG. 17.

[Thirteenth Embodiment]

In all the above embodiments, the output electrical amount (E1) of the input converter (CV1 etc) can be substantially accurately transmitted without removing a DC component of an input current. However, the output electrical amount only with an AC component can be obtained by removing the DC component (in this case, AC amplifiers are used as CV1 to CVn). If the DC component is removed, almost no change is present in differential current data Dd during the nonsaturation interval of the current transformer when the external fault occurs, thereby sufficiently generating the inhibit output. On the other hand, a change in each data in the case of the internal fault including the DC component is slightly different from that in the case of not removing the DC component. However, since this influence appears substantially similarly in data Dd and respective terminal current data Dj, the thirteenth embodiment can be applied like the above embodiments.

The method of initial fault processing described in the fifth to eighth embodiments of the present invention can be applied not only to the apparatus of the present invention but also to all the differential relay apparatuses in which the inhibit output is generated by a normal load current and continues for a while after an occurrence of the internal fault. An example of such a differential relay apparatus is disclosed in Japanese Patent Publication No. 57-50130 as described above.

In addition, various types of restraint functions f(r) described in the present invention can be applied not only to the apparatus of the present invention but also to other differential relay apparatuses. For example, function f(r) can be applied to an apparatus which operates when data Dd has a waveform with zero-crossing points. In this case, function f(r) participates in the determination of a level for detecting positive/negative of data Dd. Furthermore, an interval in which the value of data Dd is significantly small with respect to function f(r) can be detected to cause inhibition.

As has been described above, the apparatus of the present invention does not falsely operate if the current transformer is saturated due to the external fault, and reliably operates during the internal fault. In addition, if the internal fault occurs during the external fault, no delay is produced in the operation.

What is claimed is:

1. A differential relay comprising:
    means for sampling respective terminal currents in a predetermined time interval, and converting sampled currents into digital data to acquire respective terminal current data;
    restraint data preparing means for preparing one or a plurality of restraint data from said digital data sampled at the same sampling time in the respective terminal current data;
    differential current data preparing means for converting a sum of the respective terminal current data, or differential current corresponding to the sum of the respective terminal current data and sampled in the predetermined time interval, into digital data to prepare differential current data;
    restraint function calculating means for calculating values of a restraint function using a plurality of predetermined number of the restraint data sampled at different sampling times;
    differential function calculating means for calculating values of a differential function using a difference between a plurality of a predetermined number of the differential current data sampled at different sampling times;
    comparing means for comparing the values of the differential function and the restraint function, and for generating an output when the value of the differential function is smaller than a value, modified by a predetermined relationship, of the restraint function; and
    differential relay means for inhibiting an operation of the differential relay in accordance with the output from said comparing means.

2. A differential relay according to claim 1, wherein the differential function represents an absolute value of a difference between maximum and minimum values of a plurality of a predetermined number of the differential current data sampled at different sampling times.

3. A differential relay according to claim 1, wherein the differential function represents a sum of absolute values of differences of values of two differential current data sampled at adjacent sampling times of a plurality of predetermined number of the differential current data sampled at different sampling times.

4. A differential relay according to claim 1, wherein the differential function represents a maximum value of the absolute values of the differences between two differential current data sampled at adjacent sampling times of a plurality of predetermined number of the differential current data sampled at different sampling times.

5. A differential relay according to claim 1, wherein the restraint data represents a sum of absolute values of the respective terminal current data.

6. A differential relay according to claim 1, wherein the restraint data represents a maximum value of the absolute values of the respective terminal current data.

7. A differential relay according to claim 1, wherein the restraint data comprises first restraint data which represents a sum of positive data of the respective terminal current data and second restraint data which represents a sum of negative data of the respective terminal current data.

8. A differential relay according to claim 1, wherein the restraint data comprises first restraint data which represents a maximum value of zero and values of the respective terminal current data and second restraint data which represents a minimum value of zero and values of the respective terminal current data.

9. A differential relay according to claim 1, wherein the respective terminal current data comprises restraint data groups of the restraint data.

10. A differential relay according to claim 1, wherein the restraint data comprises l data which are added values of data of the respective terminal current data of some specific terminals and k data of individual terminal current data of other terminals.

11. A differential relay according to claim 1, wherein the restraint function represents an absolute value of a difference between maximum and minimum values of a plurality of predetermined number of the restraint data sampled at different sampling times.

12. A differential relay according to claim 1, wherein the restraint function represents a sum of absolute values of differences between two restraint data sampled at adjacent sampling times of a plurality of predetermined number of the restraint data sampled at different sampling times.

13. A differential relay according to claim 1, wherein the restraint function represents a maximum value of the absolute values of the differences of two restraint data sampled at adjacent sampling times of a plurality of predetermined number of the restraint data sampled at different sampling times.

14. A differential relay according to claim 1, wherein the restraint function represents a sum of auxiliary functions, the auxiliary functions representing absolute values of differences between maximum and minimum values of a plurality of predetermined number of restraint data sampled at different sampling times of a plurality of the restraint data.

15. A differential relay according to claim 1, wherein the restraint function represents a sum of the auxiliary functions, the auxiliary functions representing sums of absolute values of two restraint data sampled at adjacent sampling times of a plurality of predetermined number of the restraint data sampled at different sampling times of a plurality of the restraint data.

16. A differential relay according to claim 1, wherein the restraint function represents a sum of auxiliary functions representing maximum values of the absolute values of the differences between the values of two restraint data sampled at adjacent sampling times of a plurality of predetermined number of the restraint data sampled at different sampling times of a plurality of the restraint data.

17. A differential relay according to claim 1, wherein the restraint function represents a maximum value of auxiliary functions representing the absolute values of the differences between the maximum and minimum values of a plurality of predetermined number of the restraint data sampled at different sampling times of a plurality of the restraint data.

18. A differential relay according to claim 1, wherein the restraint function represents the maximum value of auxiliary functions representing the sums of the absolute values of the differences between the values of two restraint data sampled at adjacent sampling times of a plurality of predetermined number of the restraint data sampled at different sampling times of a plurality of the restraint data.

19. A differential relay according to claim 1, wherein the restraint function represents a maximum value of auxiliary functions representing the maximum values of the absolute values of the differences between the values of two restraint data sampled at adjacent sampling times of a plurality of predetermined number of the restraint data sampled at different sampling times of a plurality of the restraint data.

* * * * *